United States Patent
MacManus et al.

(10) Patent No.: US 11,941,502 B2
(45) Date of Patent: *Mar. 26, 2024

(54) MANIFOLD-ANOMALY DETECTION WITH AXIS PARALLEL

(71) Applicant: Optum Services (Ireland) Limited, Dublin (IE)

(72) Inventors: Lorcan B. MacManus, Co Kildare (IE); Conor Breen, Dublin (IE); Peter Cogan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 1013 days.

This patent is subject to a terminal disclaimer.

(21) Appl. No.: 16/560,842

(22) Filed: Sep. 4, 2019

(65) Prior Publication Data

US 2021/0064922 A1  Mar. 4, 2021

(51) Int. Cl.
| | |
|---|---|
| *G06N 20/20* | (2019.01) |
| *G06F 18/21* | (2023.01) |
| *G06F 18/2137* | (2023.01) |
| *G06F 18/214* | (2023.01) |
| *G06F 18/2433* | (2023.01) |
| *G06N 5/01* | (2023.01) |
| *G06N 7/01* | (2023.01) |
| *G06N 20/00* | (2019.01) |

(52) U.S. Cl.
CPC ....... *G06N 20/20* (2019.01); *G06F 18/21375* (2023.01); *G06F 18/2148* (2023.01); *G06F 18/2185* (2023.01); *G06F 18/2433* (2023.01); *G06N 5/01* (2023.01); *G06N 7/01* (2023.01); *G06N 20/00* (2019.01)

(58) Field of Classification Search
CPC ........ G06N 20/20; G06N 5/003; G06N 7/005; G06N 20/00; G06K 9/6284
See application file for complete search history.

(56) References Cited

U.S. PATENT DOCUMENTS

| | | | |
|---|---|---|---|
| 7,792,770 | B1 | 9/2010 | Phoha et al. |
| 8,468,167 | B2 | 6/2013 | Sathyanarayana et al. |
| 2005/0222928 | A1 | 10/2005 | Steier et al. |
| 2015/0254561 | A1 | 9/2015 | Singal et al. |
| 2015/0269050 | A1 | 9/2015 | Filimonov et al. |
| 2016/0042287 | A1 | 2/2016 | Eldardiry et al. |
| 2016/0048766 | A1* | 2/2016 | McMahon ............ G06Q 40/08 706/12 |

(Continued)

FOREIGN PATENT DOCUMENTS

| | | |
|---|---|---|
| CN | 107256237 A | 10/2017 |
| CN | 109032829 A | 12/2018 |
| CN | 109086291 A | 12/2018 |

OTHER PUBLICATIONS

Hou et al., "Shuffle based Anomaly Detection in Multi-state System", 2017, IEEE 7th Annual International Conference on Cyber Technology in Automation, Control, and Intelligent Systems (Cyber), vol. 7 (2017), pp. 874-879 (Year: 2017).*

Balamurali et al., "Detection of Outliers in Geochemical Data Using Ensembles of Subsets of Variables", 2018, Mathematical Geosciences, vol. 50, pp. 369-380 (Year: 2018).*

(Continued)

*Primary Examiner* — Ann J Lo
*Assistant Examiner* — Leonard A Sieger
(74) *Attorney, Agent, or Firm* — ALSTON & BIRD LLP

(57) ABSTRACT

Systems, methods, and apparatuses for detecting and identifying anomalous data in an input data set are provided.

30 Claims, 37 Drawing Sheets

Apply Plurality of Ranked Models to Data Point P

| Model | Attributes used | Most important attribute | |
|---|---|---|---|
| 1 | Fins, Legs, Wings, Eyes, Type, Species, Length, Weight | Fins | ✗ |
| 2 | Legs, Wings, Eyes, Type, Species, Length, Weight | Legs | ✗ |
| 3 | Wings, Eyes, Type, Species, Length, Weight | Wings | ✗ |
| 4 | Eyes, Type, Species, Length, Weight | Eyes | ✗ |
| 5 | Type, Species, Length, Weight | Type | ✓ |
| 6 | Species, Length, Weight | Species | |
| 7 | Length, Weight | Length | |

(56) References Cited

U.S. PATENT DOCUMENTS

| | | |
|---|---|---|
| 2016/0156596 A1 | 6/2016 | Chen |
| 2016/0253598 A1 | 9/2016 | Yamada et al. |
| 2016/0335432 A1* | 11/2016 | Vatamanu ............... G06F 21/51 |
| 2017/0193078 A1 | 7/2017 | Limonad et al. |
| 2017/0199902 A1 | 7/2017 | Mishra et al. |
| 2018/0060738 A1* | 3/2018 | Achin .................... G06N 20/00 |
| 2018/0323978 A1 | 11/2018 | Singh et al. |
| 2019/0043070 A1* | 2/2019 | Merrill ............... G06Q 30/0205 |
| 2019/0066133 A1 | 2/2019 | Cotton |
| 2019/0205234 A1* | 7/2019 | Moriyama ............. G06N 20/20 |
| 2020/0019852 A1* | 1/2020 | Yoon .................... G06V 10/764 |
| 2020/0097858 A1* | 3/2020 | Baikalov ............. G06F 18/2148 |
| 2020/0334492 A1* | 10/2020 | Yuan ......................... G06N 5/04 |
| 2021/0035235 A1* | 2/2021 | Zawadzki ............... G06N 5/045 |
| 2021/0049503 A1* | 2/2021 | Nourian ............. G06F 11/3466 |
| 2021/0097605 A1 | 4/2021 | Yeri et al. |
| 2021/0103580 A1* | 4/2021 | Schierz ............... G06F 16/2365 |

OTHER PUBLICATIONS

Elghazel et al., "Unsupervised feature selection with ensemble learning", 2015, Machine Learning, vol. 98, pp. 157-180 (Year: 2015).*

Hasan et al., "Feature Selection for Intrusion Detection Using Random Forest", 2016, Journal of Information Security, vol. 7 No. 3, pp. 129-140 (Year: 2016).*

Huang et al., "A Permutation Importance-Based Feature Selection Method for Short-Term Electricity Load Forecasting Using Random Forest", 2016, Energies, vol. 9, 767, pp. 1-24 (Year: 2016).*

Guha, Sudipto et al. "Robust Random Cut Forest Based Anomaly Detection On Streams," In International Conference On Machine Learning, Jun. 11, 2016, pp. 2712-2721.

NonFinal Office Action for U.S. Appl. No. 16/560,701, dated Nov. 29, 2021, (19 pages), United States Patent and Trademark Office, USA.

Notice of Allowance and Fee(s) Due for U.S. Appl. No. 16/560,701, dated Jan. 31, 2022, (11 pages), United States Patent and Trademark Office, USA.

* cited by examiner

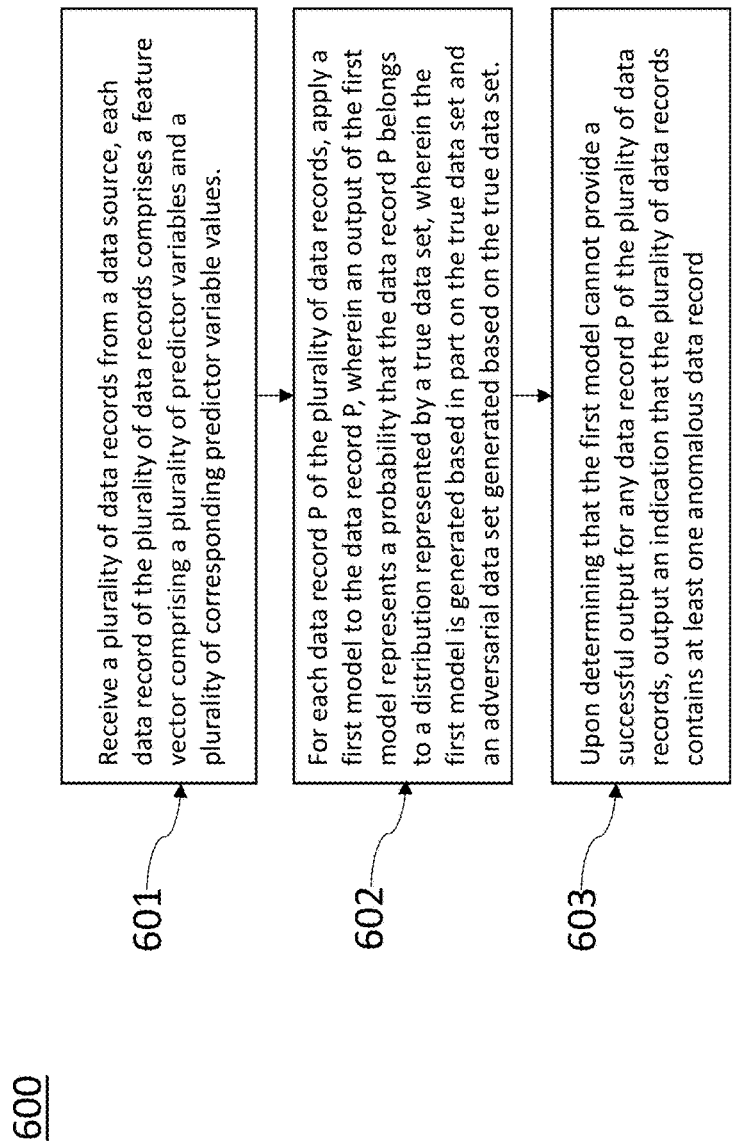

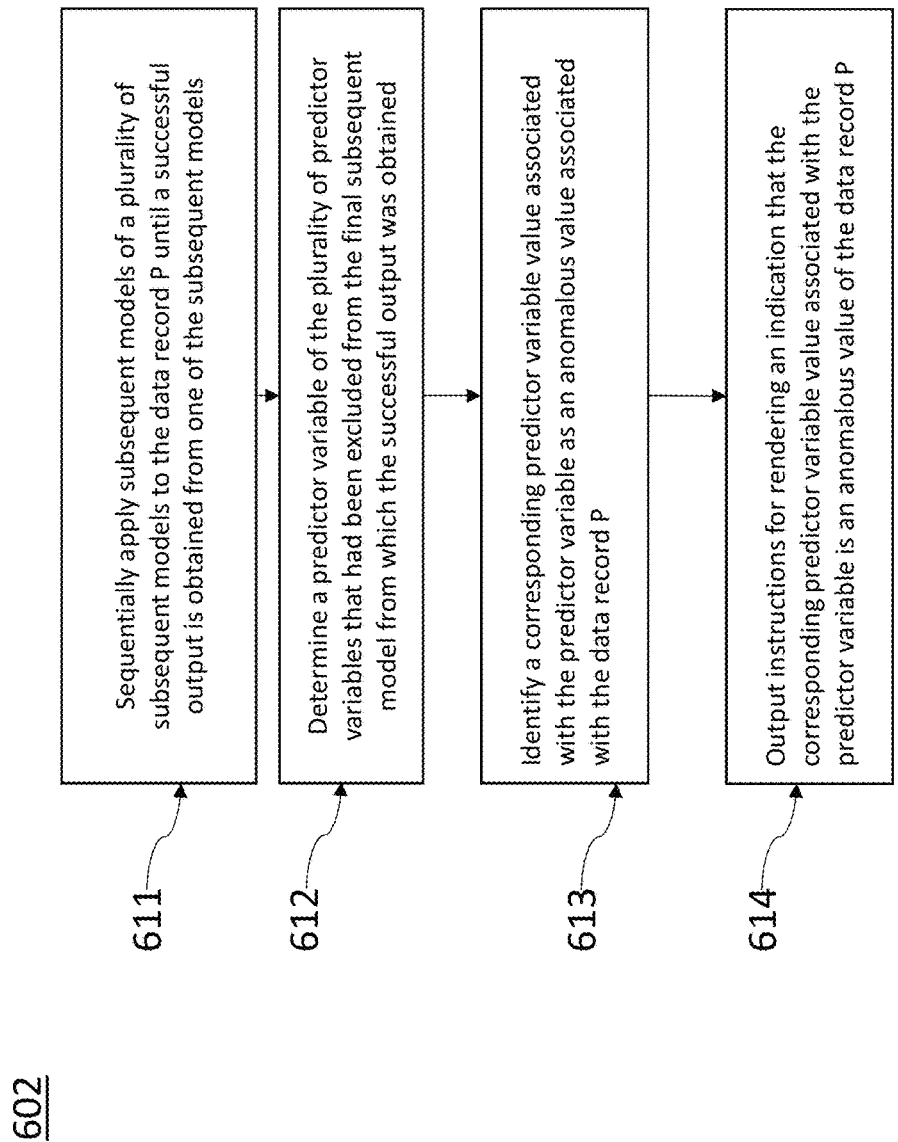

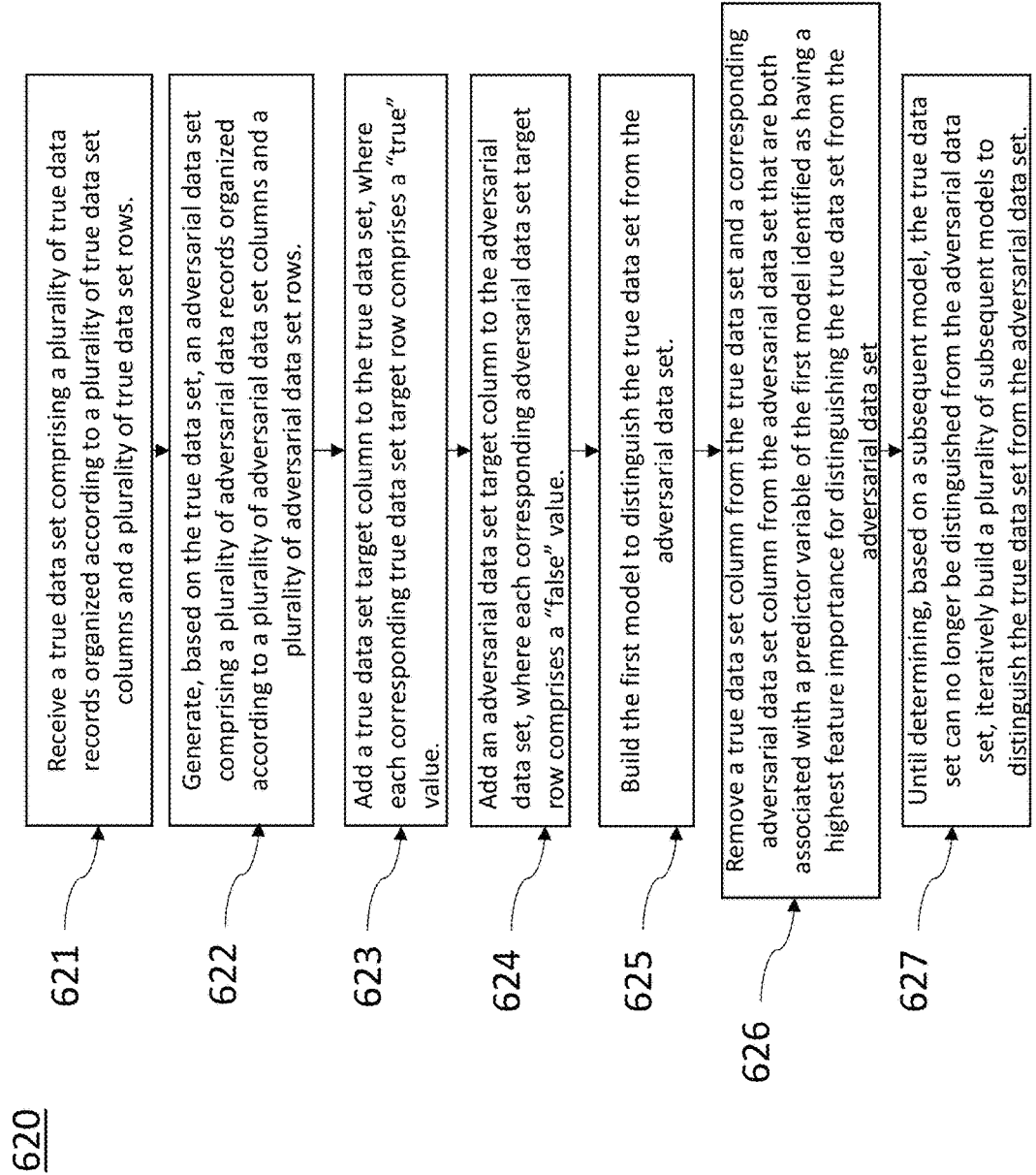

True Data Set

| Type | Species | Eyes | Legs | Wings | Fins | Length | Weight |
|---|---|---|---|---|---|---|---|
| Mosquito | Insect | 10000 | 6 | 4 | 0 | 5mm | 50mg |
| Salmon | Fish | 2 | 0 | 0 | 6 | 40cm | 10kg |
| Human | Mammal | 2 | 2 | 0 | 0 | 1.8m | 75kg |
| Python | Reptile | 2 | 0 | 0 | 0 | 2.5m | 40kg |
| Cat | Mammal | 2 | 4 | 0 | 0 | 30cm | 4kg |
| Blackbird | Bird | 2 | 2 | 2 | 0 | 12cm | 0.5kg |
| Blue whale | Mammal | 2 | 0 | 0 | 3 | 60m | 80tons |

Fig. 7A

Shuffle Each Column

| Type | Species | Eyes | Legs | Wings | Fins | Length | Weight |
|---|---|---|---|---|---|---|---|
| Blackbird | Mammal | 10000 | 6 | 4 | 0 | 5mm | 50mg |
| Crow | Fish | 2 | 0 | 0 | 6 | 40cm | 10kg |
| Cod | Reptile | 2 | 2 | 0 | 0 | 1.8m | 75kg |
| Snail | Fish | 2 | 0 | 0 | 0 | 2.5m | 40kg |
| Mouse | Insect | 2 | 4 | 0 | 0 | 30cm | 4kg |
| Blackbird | Bird | 2 | 2 | 2 | 0 | 12cm | 0.5kg |
| Cat | Bird | 2 | 0 | 0 | 3 | 60m | 80tons |
| ...etc | | | | | | | |

Shuffle Each Column

| Type | Species | Eyes | Legs | Wings | Fins | Length | Weight |
|---|---|---|---|---|---|---|---|
| Blackbird | Mammal | 8 | 6 | 4 | 0 | 5mm | 50mg |
| Crow | Fish | 0 | 0 | 0 | 6 | 40cm | 10kg |
| Cod | Reptile | 2 | 2 | 0 | 0 | 1.8m | 75kg |
| Snail | Fish | 10000 | 0 | 0 | 0 | 2.5m | 40kg |
| Mouse | Insect | 2 | 4 | 0 | 0 | 30cm | 4kg |
| Blackbird | Bird | 4 | 2 | 2 | 0 | 12cm | 0.5kg |
| Cat | Bird | 1 | 0 | 0 | 3 | 60m | 80tons |
| ...etc | | | | | | | |

Shuffle Each Column

| Type | Species | Eyes | Legs | Wings | Fins | Length | Weight |
|---|---|---|---|---|---|---|---|
| Blackbird | Mammal | 8 | 6 | 4 | 0 | 5mm | 50mg |
| Crow | Fish | 0 | 8 | 0 | 6 | 40cm | 10kg |
| Cod | Reptile | 2 | 4 | 0 | 0 | 1.8m | 75kg |
| Snail | Fish | 10000 | 6 | 0 | 0 | 2.5m | 40kg |
| Mouse | Insect | 2 | 2 | 0 | 0 | 30cm | 4kg |
| Blackbird | Bird | 4 | 6 | 2 | 0 | 12cm | 0.5kg |
| Cat | Bird | 1 | 0 | 0 | 3 | 60m | 80tons |
| ...etc | | | | | | | |

Shuffle Each Column

| Type | Species | Eyes | Legs | Wings | Fins | Length | Weight |
|---|---|---|---|---|---|---|---|
| Blackbird | Mammal | 8 | 6 | 4 | 0 | 5mm | 50mg |
| Crow | Fish | 0 | 8 | 0 | 6 | 40cm | 10kg |
| Cod | Reptile | 2 | 4 | 4 | 0 | 1.8m | 75kg |
| Snail | Fish | 10000 | 6 | 4 | 0 | 2.5m | 40kg |
| Mouse | Insect | 2 | 2 | 2 | 0 | 30cm | 4kg |
| Blackbird | Bird | 4 | 6 | 4 | 0 | 12cm | 0.5kg |
| Cat | Bird | 1 | 0 | 2 | 3 | 60m | 80tons |
| ...etc | | | | | | | |

Adversarial Data Set

720

| Type | Species | Eyes | Legs | Wings | Fins | Length | Weight |
|---|---|---|---|---|---|---|---|
| Blackbird | Mammal | 8 | 6 | 4 | 8 | 5m | 50g |
| Crow | Fish | 0 | 8 | 0 | 6 | 40mm | 1kg |
| Cod | Reptile | 2 | 4 | 4 | 0 | 2.8m | 20g |
| Snail | Fish | 10000 | 6 | 4 | 0 | 3.5cm | 2kg |
| Mouse | Insect | 2 | 2 | 2 | 0 | 40mm | 9kg |
| Blackbird | Bird | 4 | 6 | 4 | 0 | 15cm | 4.5kg |
| Cat | Bird | 1 | 0 | 2 | 3 | 60m | 150kg |
| ...etc | | | | | | | |

- Each value is individually valid
- But the rows no longer make sense

Fig. 7J

Drop Most Important Column

| Type | Species | Eyes | Legs | Wings | Fins | Length | Weight |
|---|---|---|---|---|---|---|---|
| Blackbird | Insect | 8 | 6 | 4 | | 5m | 50g |
| Crow | Fish | 0 | 8 | 0 | | 40mm | 1kg |
| Cod | Mammal | 2 | 4 | 4 | | 2.8m | 20g |
| Snail | Reptile | 10000 | 6 | 4 | | 3.5cm | 2kg |
| Mouse | Mammal | 2 | 2 | 2 | | 40mm | 9kg |
| Blackbird | Bird | 4 | 6 | 4 | | 15cm | 4.5kg |
| Cat | Mammal | 1 | 0 | 2 | | 60m | 150kg |
| ...etc | | | | | | | |

- The model will highlight one column as being the most important
- Drop it

Fig. 7L

Drop Most Important Column & Build New Model

| Type | Species | Eyes | Legs | Wings | | Length | Weight |
|---|---|---|---|---|---|---|---|
| Mosquito | Insect | 10000 | 6 | 4 | | 5mm | 50mg |
| Salmon | Fish | 2 | 0 | 0 | Fins | 40cm | 10kg |
| Human | Mammal | 2 | 2 | 0 | | 1.8m | 75kg |
| Python | Reptile | 2 | 0 | 0 | | 2.5m | 40kg |
| ...etc | | | | | | | |
| Type | Species | Eyes | Legs | Wings | | Length | Weight |
| Blackbird | Insect | 8 | 6 | 4 | | 5m | 50g |
| Crow | Fish | 0 | 8 | 0 | | 40mm | 1kg |
| Cod | Mammal | 2 | 4 | 4 | | 2.8m | 20g |
| Snail | Reptile | 10000 | 6 | 4 | | 3.5cm | 2kg |
| ...etc | | | | | | | |

Fig. 7M

Drop 2ⁿᵈ Most Important Column & Build New Model

| Type | Species | Eyes | Legs | Wings | Length | Weight |
|---|---|---|---|---|---|---|
| Mosquito | Insect | 10000 | | 4 | 5mm | 50mg |
| Salmon | Fish | 2 | | 0 | 40cm | 10kg |
| Human | Mammal | 2 | | 0 | 1.8m | 75kg |
| Python | Reptile | 2 | | 0 | 2.5m | 40kg |
| ...etc | | | | | | |

| Type | Species | Eyes | Fins | Wings | Length | Weight |
|---|---|---|---|---|---|---|
| Blackbird | Insect | 8 | | 4 | 5m | 50g |
| Crow | Fish | 0 | | 0 | 40mm | 1kg |
| Cod | Mammal | 2 | | 4 | 2.8m | 20g |
| Snail | Reptile | 10000 | | 4 | 3.5cm | 2kg |
| ...etc | | | | | | |

Fig. 7N

Drop 3rd Most Important Column & Build New Model

| Type | Species | Eyes | | | | Length | Weight |
|---|---|---|---|---|---|---|---|
| Mosquito | Insect | 10000 | | | | 5mm | 50mg |
| Salmon | Fish | 2 | | | | 40cm | 10kg |
| Human | Mammal | 2 | | Legs | | 1.8m | 75kg |
| Python | Reptile | 2 | | | | 2.5m | 40kg |
| ...etc | | | | | | | |
| Type | Species | Eyes | | | | Length | Weight |
| Blackbird | Insect | 8 | | | | 5m | 50g |
| Crow | Fish | 0 | | Wings | | 40mm | 1kg |
| Cod | Mammal | 2 | | | | 2.8m | 20g |
| Snail | Reptile | 10000 | | Fins | | 3.5cm | 2kg |
| ...etc | | | | | | | |

Fig. 70

Drop 4th Most Important Column & Build New Model

| Type | Species | Eyes | Legs | Wings | Fins | Length | Weight |
|---|---|---|---|---|---|---|---|
| Mosquito | Insect | | | | | 5mm | 50mg |
| Salmon | Fish | | | | | 40cm | 10kg |
| Human | Mammal | | | | | 1.8m | 75kg |
| Python | Reptile | | | | | 2.5m | 40kg |
| ...etc | | | | | | | |

| Type | Species | | | | | Length | Weight |
|---|---|---|---|---|---|---|---|
| Blackbird | Insect | | | | | 5m | 50g |
| Crow | Fish | | | | | 40mm | 1kg |
| Cod | Mammal | | | | | 2.8m | 20g |
| Snail | Reptile | | | | | 3.5cm | 2kg |
| ...etc | | | | | | | |

Fig. 7P

Drop 5th Most Important Column & Build New Model

| Species | Eyes | Legs | Wings | Fins | Length | Weight |
|---|---|---|---|---|---|---|
| Insect | | | | | 5mm | 50mg |
| Fish | | | | | 40cm | 10kg |
| Mammal | | | | | 1.8m | 75kg |
| Reptile | | | | | 2.5m | 40kg |

| Species | | | | | Length | Weight |
|---|---|---|---|---|---|---|
| Insect | | | | | 5m | 50g |
| Fish | | | | | 40mm | 1kg |
| Mammal | | | | | 2.8m | 20g |
| Reptile | | | | | 3.5cm | 2kg |

Type

Fig. 7Q

Drop 6th Most Important Column & Build New Model

| Type | Species | Eyes | Legs | Wings | Fins | Length | Weight |
|------|---------|------|------|-------|------|--------|--------|
|      |         |      |      |       |      | 5mm    | 50mg   |
|      |         |      |      |       |      | 40cm   | 10kg   |
|      |         |      |      |       |      | 1.8m   | 75kg   |
|      |         |      |      |       |      | 2.5m   | 40kg   |
|      |         |      |      |       |      | Length | Weight |
|      |         |      |      |       |      | 5m     | 50g    |
|      |         |      |      |       |      | 40mm   | 1kg    |
|      |         |      |      |       |      | 2.8m   | 20g    |
|      |         |      |      |       |      | 3.5cm  | 2kg    |

Fig. 7R

| Type | Species | Eyes | Legs | Wings | Fins | Length | Weight |
|------|---------|------|------|-------|------|--------|--------|
|      |         |      |      |       |      | 5m     | 50g    |
|      |         |      |      |       |      | 40mm   | 1kg    |
|      |         |      |      |       |      | 2.8m   | 20g    |
|      |         |      |      |       |      | 3.5cm  | 2kg    |
|      |         |      |      |       |      | 40mm   | 9kg    |
|      |         |      |      |       |      | 15cm   | 4.5kg  |
|      |         |      |      |       |      | 60m    | 150kg  |

The final model can no longer distinguish animals (true data set) from monsters (adversarial data set)

Fig. 7S

Result: Ranked Plurality of Models

- An ordering of the attributes (columns) by their importance in telling real from fake
- A corresponding series of models

| Model | Attributes used | Most important attribute |
|---|---|---|
| 1 | Fins, Legs, Wings, Eyes, Type, Species, Length, Weight | Fins |
| 2 | Legs, Wings, Eyes, Type, Species, Length, Weight | Legs |
| 3 | Wings, Eyes, Type, Species, Length, Weight | Wings |
| 4 | Eyes, Type, Species, Length, Weight | Eyes |
| 5 | Type, Species, Length, Weight | Type |
| 6 | Species, Length, Weight | Species |
| 7 | Length, Weight | Length |

Fig. 7T

Apply Plurality of Ranked Models to Data Point P

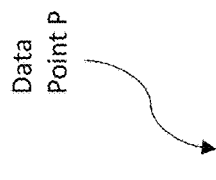
Data Point P

- Determine if a new data point is real or fake
- Determine why it is fake (if it is fake)

| Model | Attributes used | Most important attribute |
|---|---|---|
| 1 | Fins, Legs, Wings, Eyes, Type, Species, Length, Weight | Fins |
| 2 | Legs, Wings, Eyes, Type, Species, Length, Weight | Legs |
| 3 | Wings, Eyes, Type, Species, Length, Weight | Wings |
| 4 | Eyes, Type, Species, Length, Weight | Eyes |
| 5 | Type, Species, Length, Weight | Type |
| 6 | Species, Length, Weight | Species |
| 7 | Length, Weight | Length |

Fig. 9A

MANIFOLD-ANOMALY DETECTION WITH AXIS PARALLEL

BACKGROUND

Building solutions using data science typically involves developing a predictive model which takes a number of independent variables and uses historical data patterns in these independent variables to "learn" a generalized function which can be used to predict a dependent variable (otherwise referred to as a target variable). This process can be approached using a wide variety of machine learning algorithms such as linear and logistic regression, tree-based machine learning algorithms and neural networks.

The predictive model which has been trained using the historical data can then be used to make predictions on new data. An example in the health insurance industry involves a machine learning algorithm that learns a fraud pattern in historical claims and then uses this learning to predict fraud in a newly filed claim.

There are a number of restrictions to which new data must conform in order for the predictive model to make an accurate and sensible prediction. New data may be required to fulfil certain sanity checks, for instance a gender code for a person might be required to be one of M or F; there might be an appropriate dollar limit to place on a submitted health insurance claim beyond which a system might be better off assuming a data entry error; unseen levels may appear in categorical columns in new data; new data can also be of a different type (e.g., real number in historic data but character string in new data).

More generally, however, the variables in the new data must be drawn from the same distribution as the variables in the historic or training data, otherwise the predictions of the model are likely to be incorrect. Some examples of changes in data include when data in numeric columns fall far outside the distribution in historic data In data mining, anomaly detection (also outlier detection) is the identification of rare items, events or observations which raise suspicions by differing significantly from the majority of the data. Often, the anomalous items will translate to some kind of problem such as insurance fraud, bank fraud, a structural defect, medical problems or errors in a text. Anomalies are also referred to as outliers, novelties, noise, deviations and exceptions Anomaly detection is applicable in a variety of domains, such as intrusion detection, fraud detection, fault detection, system health monitoring, event detection in sensor networks, and detecting ecosystem disturbances. It is often used in preprocessing to remove anomalous data from the dataset. In supervised learning, removing the anomalous data from the dataset often results in a statistically significant increase in accuracy.

A first tier of conventional approaches to solving the aforementioned problems of anomaly detection include performing sanity checks on data, such as making sure dates are valid or that numeric fields are within a certain range. Such checks are always to be recommended—they prevent the worst type of garbage-in-garbage-out type scenarios, are cheap to implement, and can avoid costly mistakes. They can be made quite detailed provided there is sufficient domain knowledge to do so. In detail these approaches might perform manual checking of new data for distribution changes, rules-based checks on new data, and/or data validation and testing at the database level. While these methods are generally mandatory for data quality, they do not fully diagnose actual issues with data, or identify complex interactions across data which may have been introduced.

Moving to more sophisticated conventional approaches, evaluating whether a distribution of individual data columns (both numeric and categoric) has changed can rely on statistical measures such as Kullback-Leibler (KL) divergence. Evaluating whether the dataset has changed in more subtle ways (e.g. new correlations, new interactions etc) may rely on techniques such as covariate shift analysis. While both of these methods offer a more probabilistic approach to identifying differences in the datasets, KL divergence cannot capture complex interactions across fields, and covariate shift analysis cannot identify which values in which columns are driving the differences between the datasets.

Algorithms such as the well-known DBScan and Isolation Forests identify outliers through clustering approaches that leave anomalous points outside clusters. DBScan requires some heuristic parameters, such as the minimum number of cluster points and the epsilon distance measure. Isolation Forests is more general: trees are built through random partitioning of the data. This tends to filter the more isolated points to nodes near the root of the tree, whereas the more clustered points get pushed further down the trees as the space of the more clustered subset of data can be ever more finely divided. A metric based on the average distance down the tree for a particular point in the set (or for a previously unseen point) gives the extent to which the point is an outlier in this data set.

Other existing approaches all cluster on a single data set and so rely explicitly or implicitly on distance metrics over one or a small number of dimensions to identify anomalies. They also implicitly assume smoothness in the distributions, with outliers identified as those points that do not conform to broad, smooth distributions. Furthermore, these approaches are likely to be less than optimal in the high dimensional data sets typically encountered, as distance metrics in high dimensional spaces are rendered meaningless through additive noise.

Through applied effort, ingenuity, and innovation, many of these identified problems have been solved by developing solutions that are included in embodiments of the present disclosure, many examples of which are described in detail herein.

SUMMARY

According to embodiments, the present system enables the detection and identification of anomalous data within a data set.

In embodiments, an apparatus for detecting anomalous data in an input data set, the apparatus comprises at least one processor and at least one memory comprising computer program code, the at least one memory and the computer program code configured to, with the at least one processor, cause the apparatus to detect anomalous data.

In embodiments, the apparatus is configured to receive a plurality of data records from a data source. In embodiments, each data record of the plurality of data records comprises a feature vector comprising a plurality of predictor variables and a plurality of corresponding predictor variable values.

In embodiments, the apparatus is further configured to, for each data record P of the plurality of data records, apply a first model to the data record P. In embodiments, an output of the first model represents a probability that the data record P belongs to a distribution represented by a true data set. In embodiments, the first model is generated based in part on the true data set and an adversarial data set generated based on the true data set.

In embodiments, the apparatus is further configured to, upon determining that the first model cannot provide a successful output for any data record P of the plurality of data records, output an indication that the plurality of data records contains at least one anomalous data record.

In embodiments, the apparatus is further configured to, upon determining that the first model cannot provide a successful output for any data record P of the plurality of data records, sequentially apply subsequent models of a plurality of subsequent models to the data record P until a successful output is obtained, determine a predictor variable of the plurality of predictor variables that had been excluded from a final subsequent model from which the successful output was obtained, and identify a corresponding predictor variable value associated with the predictor variable as an anomalous value associated with the data record P.

In embodiments, the apparatus is further configured to generate the first model and the plurality of subsequent models. In embodiments, generating the first model and the plurality of subsequent models comprises receiving the true data set comprising a plurality of true data records organized according to a plurality of true data set columns and a plurality of true data set rows. In embodiments, each true data record of the plurality of first data records comprising a feature vector comprising a plurality of predictor variables and a plurality of corresponding predictor variable values. In embodiments, each predictor variable represents a unique true data set column of the plurality of true data set columns. In embodiments, each feature vector represents a unique true data set row of the plurality of true data set rows.

In embodiments, generating the first model and the plurality of subsequent models further comprises generating, based on the true data set, the adversarial data set comprising a plurality of adversarial data records organized according to a plurality of adversarial data set columns and a plurality of adversarial data set rows. In embodiments, each predictor variable represents an adversarial data set column of the plurality of adversarial data set columns. In embodiments, the plurality of adversarial data set rows is generated by, for each predictor variable, randomly shuffling the corresponding predictor variable values.

In embodiments, generating the first model and the plurality of subsequent models further comprises adding a first data set target column to the true data set, where each corresponding first data set target row comprises a first classification value.

In embodiments, generating the first model and the plurality of subsequent models further comprises adding a second data set target column to the second data set, where each corresponding second data set target row comprises a second classification value.

In embodiments, generating the first model and the plurality of subsequent models further comprises building the first model to distinguish the true data set from the adversarial data set, where a first model output represents a probability of a point P belonging to a sub-space represented by the true data set.

In embodiments, generating the first model and the plurality of subsequent models further comprises removing a true data set column from the true data set and a corresponding adversarial data set column from the adversarial data set that are both associated with a predictor variable of the first model identified as having a highest feature importance for distinguishing the true data set from the adversarial data set.

In embodiments, generating the first model and the plurality of subsequent models further comprises, until determining, based on a subsequent model, that the true data set can no longer be distinguished from the adversarial data set, iteratively building a plurality of subsequent models to distinguish the true data set from the adversarial data set. In embodiments, each subsequent model is built without a true data set column and adversarial data set column associated with a predictive variable of an immediately preceding subsequent model as having a highest feature importance for distinguishing the true data set from the adversarial data set. In embodiments, the first model and the subsequent models are ranked in an order from most predictive variables to least predictive variables.

In embodiments, each of the first model and subsequent models comprise a model whose output comprises a feature importance score. In embodiments, each of the first model and subsequent models comprise a gradient boosted model comprising a plurality of decision trees. In embodiments, each decision tree has a plurality of decision tree feature importance measures associated therewith. In embodiments, a decision tree feature importance measure represents an amount that each feature split point in the decision tree associated with a particular feature improves a decision tree performance.

In embodiments, the apparatus is further configured to generate an anomaly free data records set comprising a subset of the plurality of data records by removing each data record associated with an anomalous value from the plurality of data records and transmit the anomaly free data records set to a downstream data consumer.

In embodiments, the apparatus is further configured to transmit instructions for rendering an indication that a corresponding predictor variable value associated with the predictor variable is an anomalous value associated with the data record P.

In embodiments, the subsequent models are sequentially applied to the data record P in an order according to their respective rankings.

In embodiments, the input data set comprises insurance claims data.

In embodiments, an apparatus for identifying anomalous data in an input data set comprising anomalous data comprises at least one processor and at least one memory comprising computer program code, the at least one memory and the computer program code configured to, with the at least one processor, cause the apparatus to identify anomalous data in a data set comprising anomalous data.

In embodiments, the apparatus is configured to receive a plurality of data records from a data source. In embodiments, each data record of the plurality of data records comprising a feature vector comprises a plurality of predictor variables and a plurality of corresponding predictor variable values. In embodiments, the plurality of data records comprises at least one anomalous data record.

In embodiments, the apparatus is configured to, for each data record P of the plurality of data records, sequentially apply each ranked model of a plurality of ranked models to the data record P until a successful output is obtained from a ranked model.

In embodiments, the apparatus is configured to, upon determining a successful output has been obtained from a ranked model, determine a predictor variable of the plurality of predictor variables that has been excluded from the ranked model from which the successful output was obtained.

In embodiments, the apparatus is configured to identify a corresponding predictor variable value associated with the predictor variable as an anomalous value associated with the data record P.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION

Having thus described the disclosure in general terms, reference will now be made to the accompanying drawings, which are not necessarily drawn to scale, and wherein:

FIG. 1 provides an illustration of an exemplary embodiment of the present disclosure;

FIG. 2 provides an illustrative schematic of an exemplary management computing entity according to one embodiment of the present disclosure;

FIG. 3 provides an illustrative schematic representative of an exemplary mobile computing entity that can be used in conjunction with embodiments of the present disclosure;

FIG. 6A illustrates an exemplary process flow for use with embodiments of the present disclosure;

FIG. 6B illustrates an exemplary process flow for use with embodiments of the present disclosure;

FIG. 6C illustrates an exemplary process flow for use with embodiments of the present disclosure;

FIGS. 9A-9F illustrate an example of applying a plurality of ranked models to a data point according to embodiments of the present disclosure.

DETAILED DESCRIPTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

Embodiments of the present disclosure provide a solution to the problem that the predictions of probabilistic models are only valid when the variables of unseen data are drawn from the same distribution as the variables in the historic or training data. Embodiments of the present disclosure automatically verify new/unseen data to ensure it is free from anomalies in each individual field or column.

Figure 4:
FIG. 4 illustrates an exemplary architecture for use with embodiments of the present disclosure.

FIG. 4 illustrates an exemplary architecture for use with embodiments of the present disclosure. In FIG. 4, a plurality of data sources may provide streams of data to an anomaly detection service according to embodiments of the present disclosure. The anomaly detection service provides anomaly detection and removal from the streams of data so that downstream data consumers may make data driven decisions based on data sets conforming to distributions similar to those of training data sets associated with their decision making models.

Embodiments of the present disclosure start with a true data set (e.g., the "A set") and construct an adversarial data set (e.g., the "B set") by independently shuffling each column of the true data set (e.g., the "A set"). The resulting adversarial data set (e.g., the "B set") has column means and column variances that are the same as the true data set (e.g., the "A set"), however column to column covariances in the adversarial data set (e.g., the "B set") are much greater than in the true data set (e.g., the "A set").

An ordered series of models is trained to distinguish the true data set (e.g., the "A set") from the adversarial data set (e.g., the "B set"). The ordered series of models are constructed by way of the following: (1) a first model (e.g., Model 0 or "M_0") uses all dimensions of the A set and the B set; (2) a second model drops the most important feature or dimension returned by the first model (i.e., Model 0 or "M_0") from both the A set and the B set; (3) . . . (N) subsequent models are built similarly to build a total of N models $\{M\_0, \ldots, M\_\{N-1\}\}$ until the model validation metrics signify that the Model N-1 (i.e., M_{N-1}) has substantially lost its ability to distinguish the reduced set A {N-1} from B_{N-1}.

The result is:

A series of data sets $\{A\_0, \ldots, A\_\{N-1\}\}$ and $\{B\_0, \ldots, B\{N-1\}\}$, each $\{A\_i, B\_i\}$ pair being the true and the adversarial data set formed by dropping the first i columns from A and B as described above; and A corresponding series of models $\{M\_0, \ldots, M\_\{N-1\}\}$ which return the probability of a point P belonging to the respective sub-spaces defined by $\{A\_0, \ldots, A\_\{N-1\}\}$.

Essentially, each model is a function that gives the probability of an input point belonging to the subspace manifold defined by the A_i set.

New data points may be presented to each of the models $\{M\_0, \ldots, M\_\{N-1\}\}$ in turn to determine if the point lies along the subspace defined by that model. When a new point P is being assessed, it is scored with Model 0 first. If it passes this test (i.e. it has an acceptable probability of belonging to A) the data point is accepted. If it fails, the point P_i (the point formed by dropping successive dimensions of P) is scored against models M_1, . . . , M_i until the point is found to be acceptable. From this, it can be determined not only if P is an outlier but also pinpoint the outlier dimensions (if any).

Accordingly, it can be determined if a point is drawn from the same distribution as the original true data set (e.g., the "A set"), and if it is not, the particular dimensions that cause the most variation from the A set manifold can be pinpointed.

Embodiments of the present disclosure therefore not only detect anomalous points, but since no transformation was performed on the input data sets, this explanation is axis-parallel to the original domain thus leading to immediate interpretability. Such an invention can be used for pointwise anomaly detection, change detection in online data, and determining if new batch data can be reliably scored with a pre-trained model. It does not rely on any data domain knowledge and allows the data to 'tell its own story' in the sense that the data decide on the importance of scaling and the data discover important interactions between dimensions. Furthermore, no smoothness assumptions are made about the data, and the embodiments permit points that would normally be classified as outliers by more standard algorithms. Distance scores are not relied upon along any one dimension, which do not properly account for interactions between dimensions. Nor are Euclidean type distance scores relied upon, which become unreliable in high-dimensional space.

Embodiments of the present disclosure rely on a surprising property of high dimensional data—that distinctive data sets are easier to separate by their variance rather than by their mean.

of separability starts after the first 10 or so dimensions, with considerable confusion between the A and B sets by the time the model building gets to around 50 dimensions.

Table 1 below shows how the features of this particular data set (e.g., insurance claim data) are consumed and discarded by each successive model, for the first 20 models built. It can be seen that there is considerable structure in the A set around the various dates: starting with the month (mnth), then bill receive date (bil_recv_dt), claim paid date (clm_pd_dt), updated date (updt_dt), etc. The next tranche of structure is around the reason codes (fnl_rsn_cd_sys_id, srvc_lvl_rsn_cd_sys_id), payer description (payo_desc), etc.

TABLE 1

Example Features Consumed and Discarded By 20 Successive Models

| Model | Feature 1 | Feature 2 | Feature 3 | Feature 4 |
|---|---|---|---|---|
| 1 | mnth | bil_recv_dt | clm_pd_dt | adjd_dt |
| 2 | bil_recv_dt | clm_pd_dt | adjd_dt | prov_catgy_cd |
| 3 | clm_pd_dt | adjd_dt | lst_srvc_dt | updt_dt |
| 4 | updt_dt | adjd_dt | fst_srvc_dt | erly_srvc_dt |
| 5 | erly_srvc_dt | adjd_dt | fst_srvc_dt | fnl_rsn_cd_sys_id |
| 6 | fnl_rsn_cd_sys_id | adjd_dt | payo_desc | srvc_lvl_rsn_cd_sys_id |
| 7 | adjd_dt | prov_clss_cd | prov_catgy_cd | clm_loc_cd |
| 8 | srvc_lvl_rsn_cd_sys_id | fst_srvc_dt | payo_desc | dscnt_typ_cd |
| 9 | fst_srvc_dt | payo_desc | prov_catgy_cd | dscnt_typ_cd |
| 10 | dscnt_typ_cd | prov_prtcp_sts_cd | payo_desc | prov_catgy_cd |
| 11 | payo_desc | prov_catgy_cd | seg_code | prov_clss_cd |
| 12 | prov_clss_cd | prov_catgy_cd | seg_code | fm_typ_cd |
| 13 | prov_catgy_cd | seg_code | fm_typ_cd | proc_rvnu_cd |
| 14 | seg_code | fm_typ_cd | proc_rvnu_cd | clm_loc_cd |
| 15 | proc_rvnu_cd | gdr_cd | clm_loc_cd | fm_typ_cd |
| 16 | gdr_cd | fm_typ_cd | clm_loc_cd | atd_prov_npi_nbr |
| 17 | fm_typ_cd | clm_loc_cd | atd_prov_npi_nbr | form |
| 18 | clm_loc_cd | ref_prov_npi_nbr | rvnu_cd | atd_prov_npi_nbr |
| 19 | ref_prov_npi_nbr | rvnu_cd | bil_typ_cd | form |
| 20 | rvnu_cd | form | st_abbr_cd | bil_typ_cd |

As such the present embodiments build a model that can predict membership of the A set vs. the B set. It is important that this model be a good model, with not only an AUC (i.e., "area under the curve" or a degree or measure of separability, which tells how much a model is capable of distinguishing between classes) of 1 or very close to 1, but with a very low value for logloss too (i.e., the higher the AUC, the better the model is at predicting 0s as 0s and 1s and 1s, or the better the model is at distinguishing between insurance claims that are fraudulent or not fraudulent). This is because the aim of the model is to map the boundaries of the data in the A set. The boundary between A and B is constructed with reference to the data points in A and B.

Figure 5A:
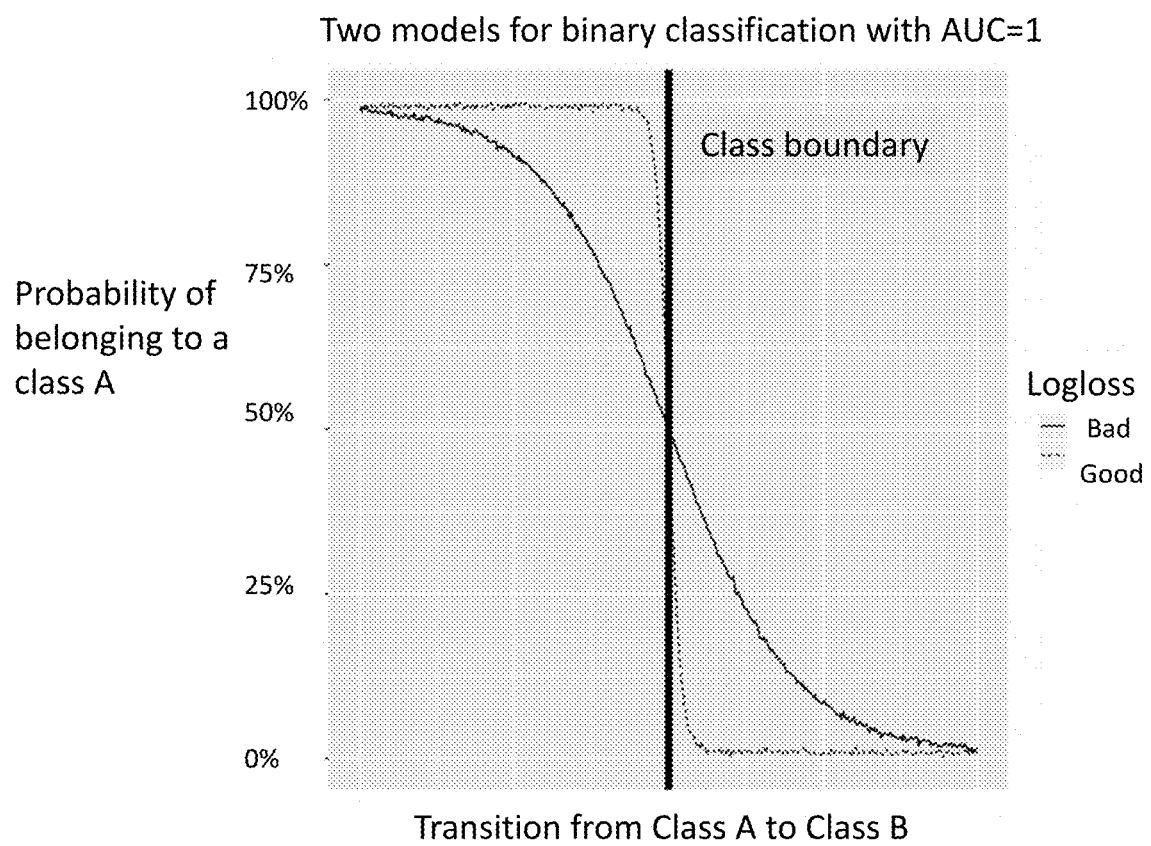
FIG. 5A illustrates an exemplary data comparison for use with embodiments of the present disclosure.

FIG. 5A illustrates this objective for a binary classifier with two classes, A and B. The data boundary is shown by the vertical line. In all cases the probability a point belongs to its respective class is greater than 50%, leading to an AUC of 1 in both models. However, the better model maintains a high probability of (correct) class membership until it gets very close to the data boundary, whereas the poorer model is much less certain as it approaches the data boundary. Simply put, the better model will provide more defined boundaries between the classes.

Figure 5B:
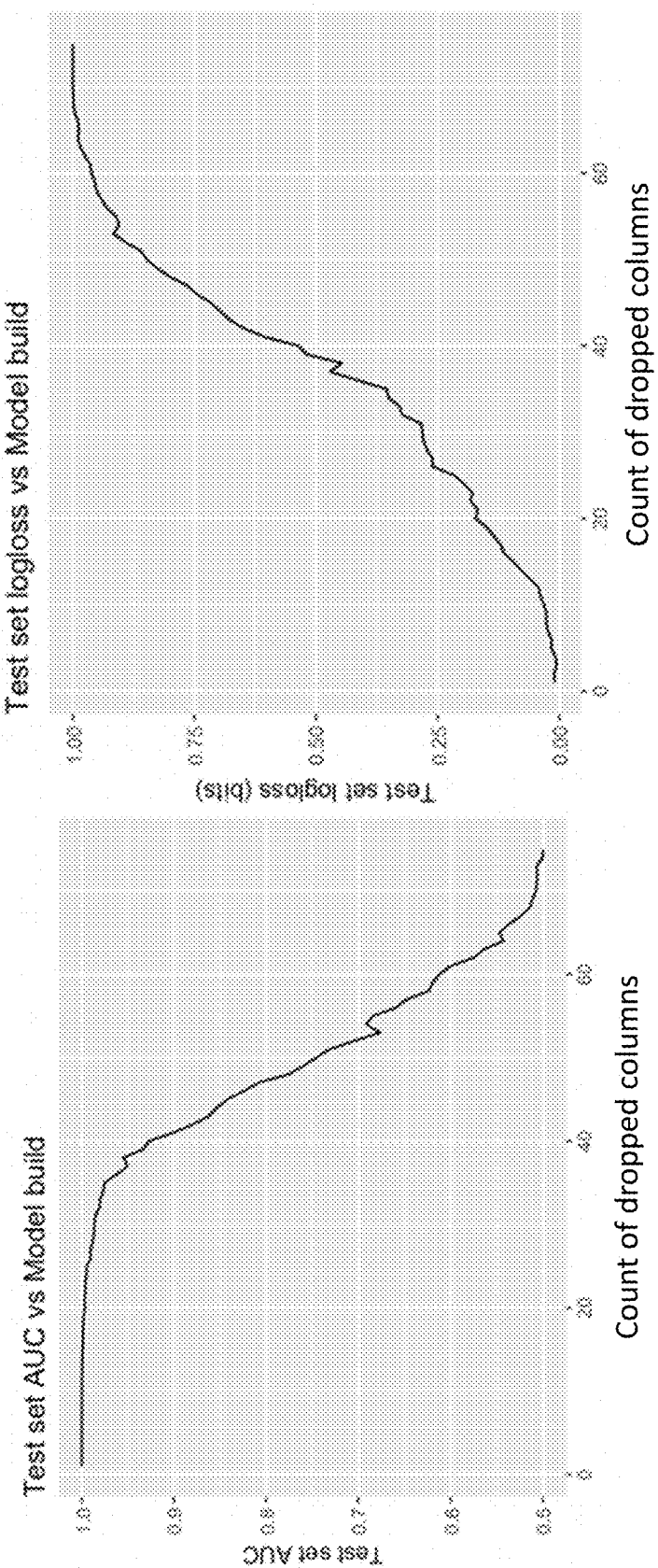
FIG. 5B illustrates exemplary experimental results based on embodiments of the present disclosure.

Referring to FIG. 5B, the plot on the left shows a test set AUC as successive models are built against fewer and fewer dimensions. The sets remain perfectly separable for about the first 20 dimensions, then the separability tails off. The logloss plot on the right reveals more detail. As these are balanced sets, the logloss rises to a maximum of 1 bit. Loss Shown in Table 1, as each model is fit, the most important dimension as reported by the model build process is removed from further consideration. Embodiments of the present disclosure progress in this way, successively removing the dimensions with the highest co-dependencies (the dimensions that are providing the greatest structure in the data). Finally, a set of dimensions remains that exhibit little structure in the remaining dimensions and so a model cannot be built using them to distinguish the A N set from the B N set.

As mentioned above, predictions of probabilistic models are only valid when the variables (i.e., predictor variable values) in previously unseen data are drawn from the same distribution as the variables (i.e., predictor variable values) in the historic or training data.

Embodiments of the present disclosure address this requirement through an automated solution which checks and verifies new data (whether it is for loading to a database, use with a predictive model, or the like) to ensure that it is free from anomalies in each individual field (or column). Furthermore, anomalies are not defined on underlying assumptions of smoothness in the data set; instead a known, valid data set is allowed define the anomalous values. This can provide invaluable information in the data validation process and also serve as an early warning system in predictive modelling that prediction is about to be attempted on data which does not match the distribution of historical training data. The solution is not dependent on any pre-defined rules. The solution can determine both if and where anomalies exist in new data.

Embodiments of the present disclosure can be built into the "predict" function of any existing machine learning algorithm as an early warning detection system that can flag that new data to be used for prediction differs significantly from data on which the algorithm was changed. The user can automatically isolate the fields which are problematic in terms of distribution changes.

Embodiments of the present disclosure enable determination of change points in online data, as they produce an anomaly score when presented with each point. An anomaly scoring process is used to present the online data to model M_0. A data point of the online data is considered anomalous if it is rejected by model M_0 by some margin, i.e. for some threshold of probability (i.e., anomaly) score.

Embodiments of the present disclosure can be incorporated into data engineering processes, particularly at the validation stage. This would enable an automated check that new data being ingested into a database is not anomalous in terms of a significantly different distribution to historical data.

Embodiments of the present disclosure ensure that automated data driven decisions are based on the appropriate data sets so that unnecessary harm is not experienced at a downstream data consumer. Further, by removing anomalies from data sets, embodiments of the present disclosure provide for a reduction in waste of computing resources as additional memory, communication bandwidth, and processing time/power are freed up when unnecessary data is removed from the data sets.

II. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

I. EXEMPLARY SYSTEM ARCHITECTURE

Figure 1:
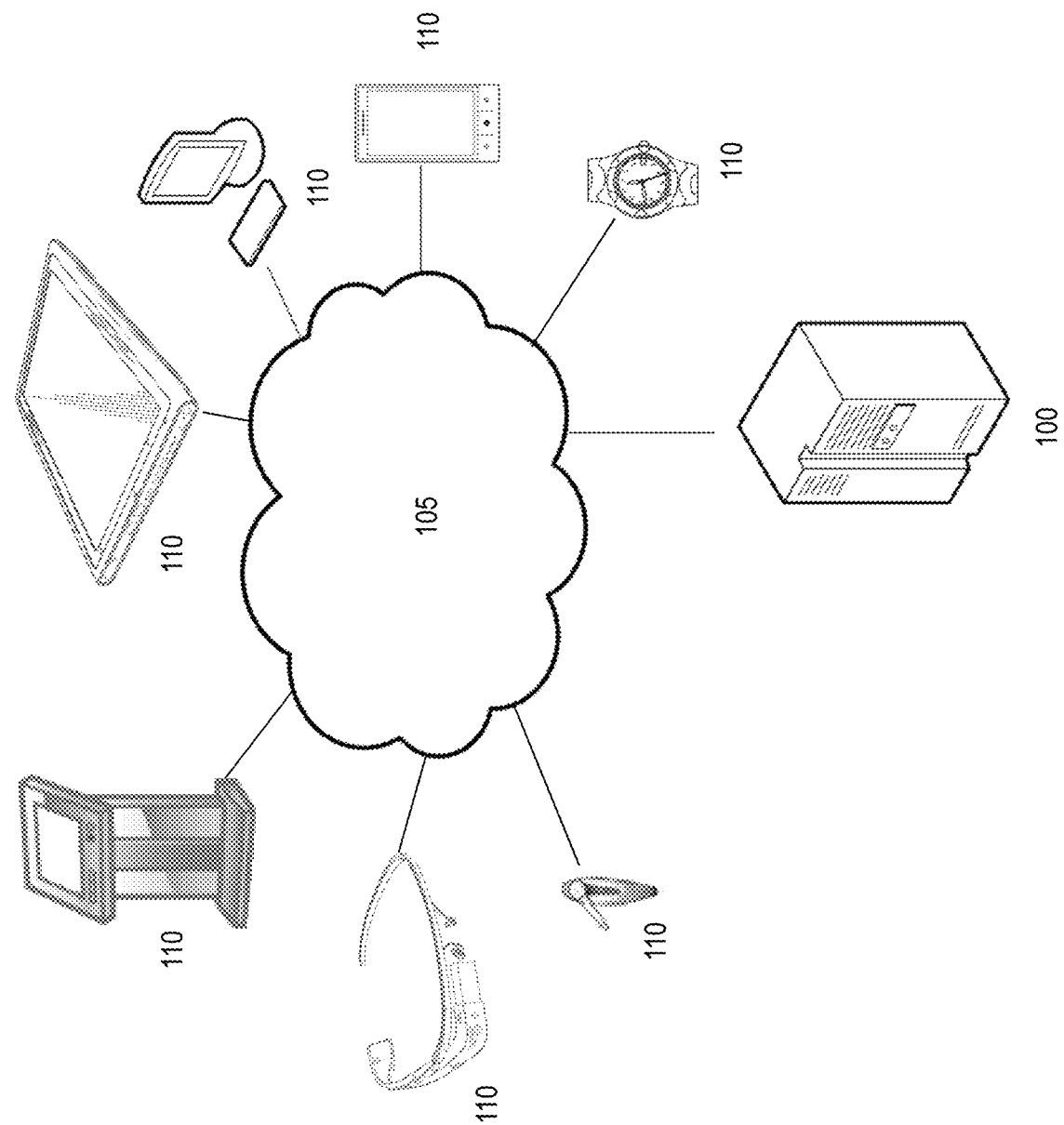

FIG. 1 provides an illustration of an exemplary embodiment of the present disclosure. As shown in FIG. 1, this particular embodiment may include one or more management computing entities 100, one or more networks 105, and one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Management Computing Entity

Figure 2:
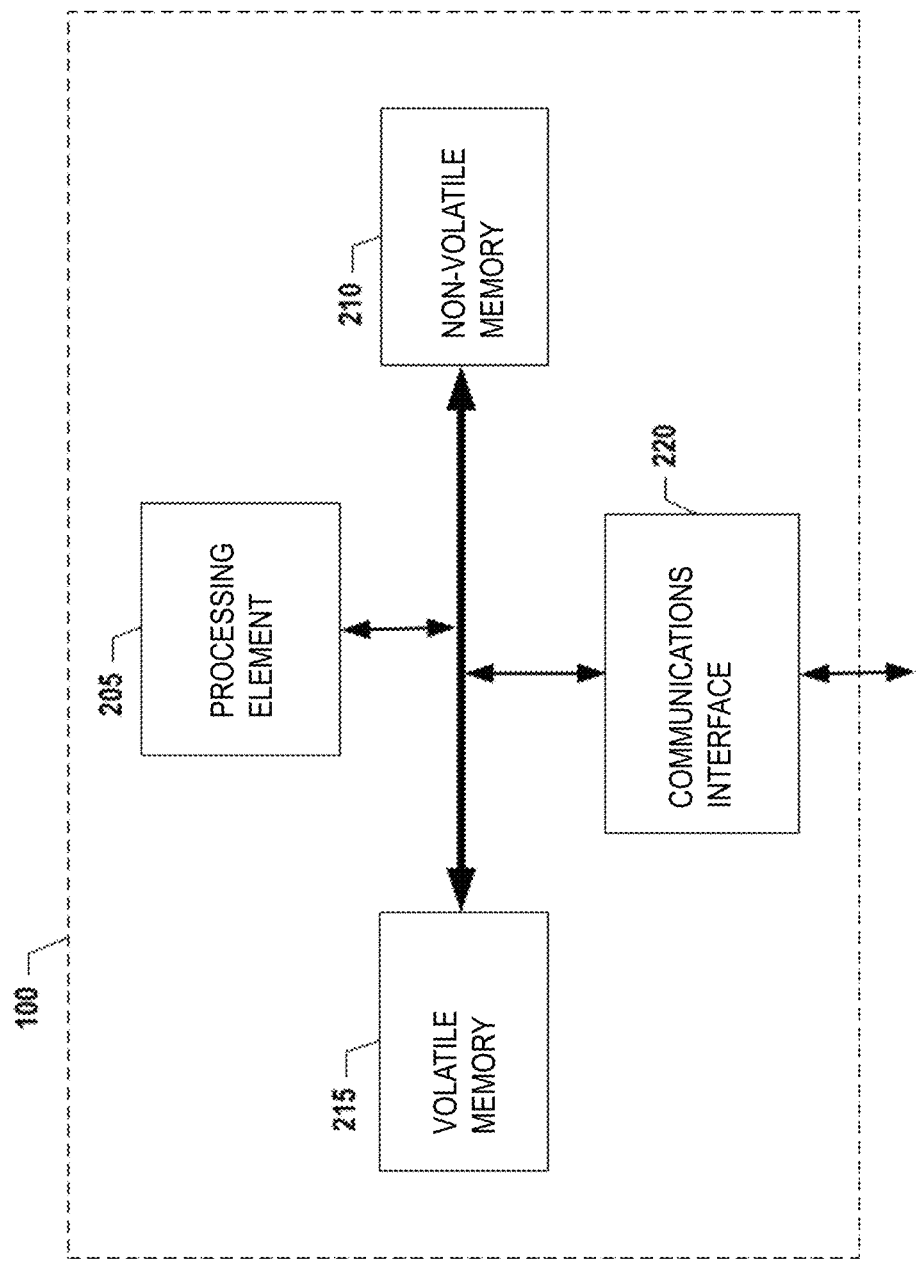

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
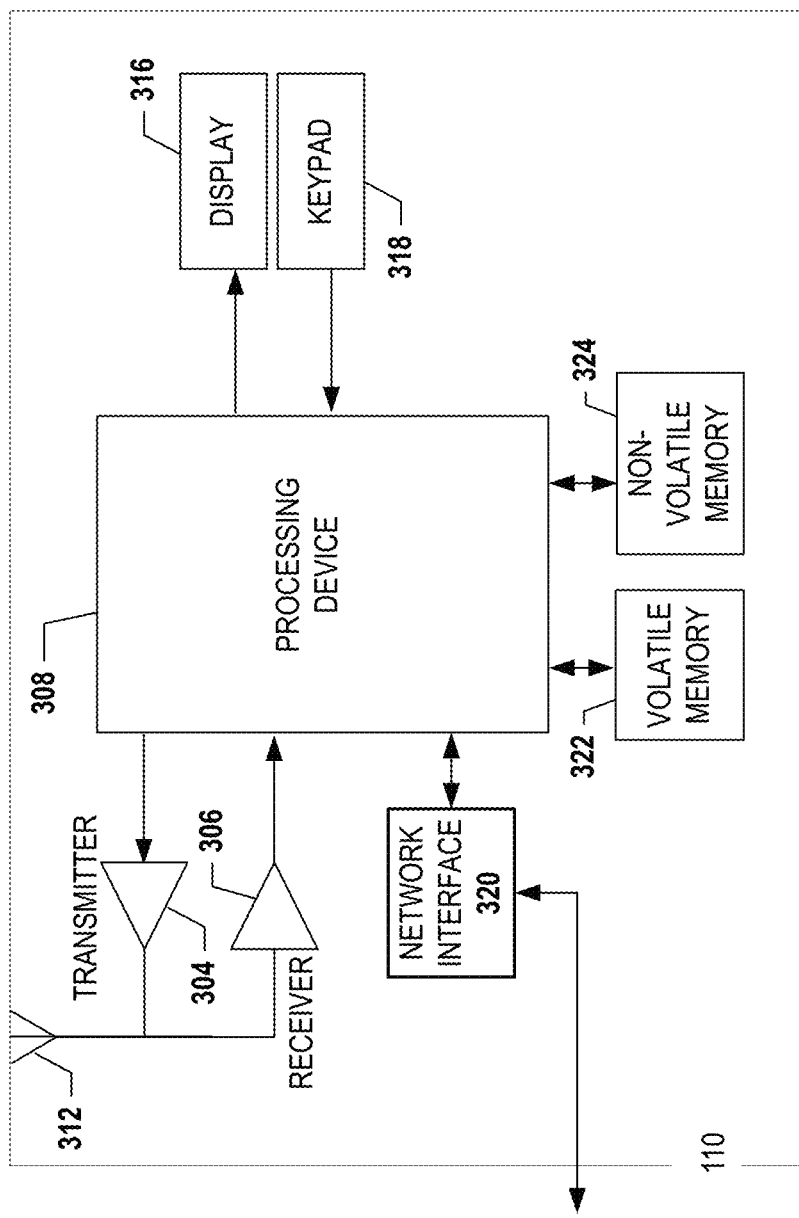

A user may be an individual, a family, a company, an organization, an entity, a department within an organization, a representative of an organization and/or person, and/or the like. To do so, a user may operate a user computing entity 110 that includes one or more components that are functionally similar to those of the management computing entity 100. FIG. 3 provides an illustrative schematic representative of a user computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the management computing entity 100. In a particular embodiment, the user computing entity 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the management computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the management computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the management computing entity 100 and/or various other computing entities.

In another embodiment, the user computing entity 110 may include one or more components or functionality that are the same or similar to those of the management computing entity 100, as described in greater detail above. As will be recognized, these architectures and descriptions are provided for exemplary purposes only and are not limiting to the various embodiments.

II. EXEMPLARY DEFINITIONS

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices/entities, such as, for example, one or more servers, relays, routers, network access points, base stations, hosts, and/or the like, sometimes referred to herein as a "network." Similarly, where a computing device is described herein to transmit data to another computing device, it will be appreciated that the data may be sent directly to another computing device or may be sent indirectly via one or more intermediary computing devices/entities, such as, for example, one or more servers, relays, routers, network access points, base stations, hosts, and/or the like.

It should be appreciated that the term "programmatically expected" indicates machine prediction of occurrence of certain events.

As used herein, the term "likelihood" refers to a measure of probability for occurrence of a particular event.

The term "machine learning model" refers to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data.

A machine learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the machine learning model is a regression model.

The term "target variable" refers to a value that a machine learning model is designed to predict. In the present embodiments, historical data is used to train a machine learning model to predict the target variable. Historical observations of the target variable are used for such training.

The terms "dataset" and "data set" refer to a collection of data. A data set can correspond to the contents of a single database table, or a single statistical data matrix, where every column of the table represents a particular variable (e.g., a predictor variable), and each row corresponds to a given member (e.g., a data record) of the data set in question. The data set can be comprised of tuples (e.g., feature vectors). In embodiments, a data set lists values for each of the variables, such as height and weight of an object, for each member (e.g., data record) of the data set. Each value is known as a datum. The data set may comprise data for one or more members, corresponding to the number of rows.

The term "data record" refers to an electronic data value within a data structure. A data record may, in some embodiments, be an aggregate data structure (e.g., a tuple or struct). In embodiments, a data record is a value that contains other values. In embodiments, the elements of a data record are referred to as fields or members. In embodiments, data may come in records of the form: $(x, Y)=(x_1,x_2,x_3, \ldots , x_k,Y)$ where the dependent variable Y is the target variable that the model is attempting to understand/classify, or generalize. The vector x (i.e., feature vector) is composed of the features $x_1$, $x_2$, $x_3$, etc. that are used for the task. The features may be representative of attributes associated with a data record.

The term "feature vector" refers to an n-dimensional vector of features that represent an object. N is a number. Many algorithms in machine learning require a numerical representation of objects, and therefore the features of the feature vector may be numerical representations.

In the pattern recognition field, a pattern is defined by the feature xi which represents the pattern and its related value yi. For a classification problem, yi represents a class or more than one class to which the pattern belongs. For a regression problem, yi is a real value. For a classification problem, the task of a classifier is to learn from the given training dataset in which patterns with their classes are provided. The output of the classifier is a model or hypothesis h that provides the relationship between the attributes xi and the class yi. The hypothesis h is used to predict the class of a pattern depending upon the attributes of the pattern. Neural networks, naive Bayes, decision trees, and support vector machines are popular classifiers.

In decision analysis, a decision tree can be used to visually and explicitly represent decisions and decision making. In data mining, a decision tree describes data (but the resulting classification tree is used as an input for decision making).

In embodiments, a decision tree is in the form of a tree structure, where each node is either a leaf node (indicates the prediction of the model), or a split node (specifies some test to be carried out on a single attribute-value), with two branches. A decision tree can be used to make a prediction by starting at the root of the tree and moving through it until a leaf node is reached, which provides the prediction for the example.

In decision tree leaning, the goal is to create a model that predicts the value of a dependent variable based on several independent variables. Each leaf of the decision tree represents a value of the dependent variable given the values of the independent variables, represented by the path from the root to the leaf (passing through split nodes).

Gradient boosting is a machine learning technique for regression and classification problems which produces a prediction model in the form of an ensemble of weak prediction models, typically decision trees. It builds the model in a stage-wise fashion like other boosting methods do, and it generalizes them by allowing optimization of an arbitrary differentiable loss function. For example, gradient boosting combines weak learners into a single strong learner in an iterative fashion. Gradient boosting tends to aggressively exploit any opportunity to improve predictive accuracy, to the detriment of clarity of interpretation (or, indeed, the feasibility of any interpretation whatsoever).

The term "classifier" refers to a class or type to which data is said to belong or with which the data is said to be associated.

The term "regression model" refers to a supervised model in which the dependent variable is a numeric variable.

The term "classification model" refers to a supervised model in which the dependent variable is a categorical variable. A classification model may be referred to as a classifier.

The terms "classifier algorithm" or "classification algorithm" refer to a classifier algorithm which estimates a classification model from a set of training data. The "classifier algorithm" uses one or more classifiers and an associated algorithm to determine a probability or likelihood that a set of data (e.g., a plurality of input data records) belong to another set of data (e.g., a distribution represented by a data set, or a distribution represented by a true data set). Put another way, a classification problem involves distinguishing one or more classes of data from other classes of data. An example of such a classification problem may involve a model trained to distinguish a first data set from a second data set. A decision tree model where a target variable can take a discrete set of values is called a classification tree (i.e., and therefore can be considered a classifier or classification algorithm).

The term "numeric variable" refers to a variable whose values are real numbers. Numeric variables may also be referred to as real-valued variables or continuous variables.

The term "ordinal variable" refers to a variable whose values can be ordered, but the distance between values is not meaningful (e.g., first, second third, etc.).

The term "categorical variable" refers to a variable whose values are discrete and unordered. These values are commonly known as "classes."

The term "dependent variable" refers to a variable whose value depends on the values of independent variables. The dependent variable represents the output or outcome whose variation is being studied. A dependent variable may also be referred to as a response, an output variable, or a target variable.

The terms "independent variable" or "predictor variable" refer to a variable which is used to predict the dependent variable, and whose value is not influenced by other values in the supervised model. Models and experiments described herein test or determine the effects that independent variables have on dependent variables. Supervised models and statistical experiments test or estimate the effects that independent variables have on the dependent variable. Independent variables may be included for other reasons, such as for their potential confounding effect, without a wish to test their effect directly. In embodiments, predictor variables are input variables (i.e., variables used as input for a model are referred to as predictors). In embodiments, predictor or input variables are also referred to as features. Independent variables may also be referred to as features, predictors, regressors, and input variables.

The terms "supervised model," "model," and "predictive model" refer to a supervised model, which is an estimate of a mathematical relationship in which the value of a dependent variable is calculated from the values of one or more independent variables. The functional form of the relationship is determined by the specific type (e.g. decision tree, GLM, gradient boosted trees) of supervised model. Individual numeric components of the mathematical relationship are estimated based on a set of training data. The set of functional forms and numerical estimates a specific type of supervised model can represent is called its "hypothesis space."

The term "distribution" refers to a listing or functions of all possible values (or intervals) of data for a particular data set (and how often they occur).

The term "true data set" refers to a data set that is known to contain valid or true classifications for each data record of the data set. A true data set may comprise a set of rows (i.e., a plurality of true data set rows) and a set of columns (i.e., a plurality of true data set columns). In embodiments, a true data set column represents a predictor variable of a feature vector of a data record. In embodiments, a true data set row represents a feature vector of a data record (i.e., each entry of the true data set row comprises a predictor variable value for the corresponding predictor variable represented by each column, and the predictor variable values of the row are associated with a single data record). A true data set may have appended thereto a target variable column (i.e., a first data set target column). In such embodiments, each corresponding first data set target row of the first data set target column is assigned a first classification value (e.g., true).

The term "adversarial data set" refers to a data set that is generated for a specific true data set, where the adversarial data set is generated by independently shuffling values in each column contained in the true data set. An adversarial data set may comprise a set of rows (i.e., a plurality of adversarial data set rows) and a set of columns (i.e., a plurality of adversarial data set columns). In embodiments, an adversarial data set column represents a predictor variable of a feature vector of a data record. In embodiments, each adversarial data set column corresponds to a true data set column. In embodiments, predictor variable values contained in a true data set column are randomly shuffled to produce the adversarial data set column. An adversarial data set may have appended thereto a target variable column (i.e., a second data set target column). In such embodiments, each corresponding second data set target row of the second data set target variable column is assigned a second classification value (e.g., "false").

In embodiments, the adversarial data set comprises column means and column variances that are the same as those of the true data set, but the column to column covariances are much greater in the adversarial data set as opposed to the true data set. As a result, it is assumed that the true data set is sparse in its high dimensional space, which is the same thing as saying that the true data set exhibits considerable structure (i.e., it is this structure that gives the true data set its 'fingerprint').

The term "anomalous data" refers to one or more values (e.g., predictor variable values) of a particular data point (e.g., data record) that is considered an outlier or unusual as compared to a data set that was used to train a particular model that may be used to classify the data record.

The term "data source" refers to an entity from which data records are received. In embodiments, a data source may comprise a wide variety of computing or other entities, including an array of sensors, logs of web applications, security cameras, a database or repository, and the like.

The term "ranked models" refers to a plurality of models generated based on a true data set and an adversarial data set. Each subsequent model is built based on a true data set and an adversarial data set that has had a column (i.e., a feature or predictor variable) removed, where the column to be removed was identified as the most important feature for a successful classification for an immediately preceding model. Accordingly, a plurality of models is generated and they are ranked according to how many predictor variables remain in the model (i.e., a first model is built using all of the predictor variables, a second model is built using one fewer predictor model than the first model, and so on).

The term "successful output" refers to a successful classification of a data record by a model. That is, given a data record of an input data set, a model is able to evaluate the independent variables of the data record and provide a prediction as to the independent or target variable for the data record.

The term "feature importance measure" refers to a programmatically generated measure of how important a particular feature was in reaching a successful output for a specific model.

The term "decision tree feature importance measure" refers to a programmatically generated measure of an amount that each feature split point in a decision tree associated with a particular feature improves a decision tree performance (e.g., how important was the particular feature in reaching a successful output).

The term "anomaly free data records set" refers to a set of data records that has been generated based on a larger set of data records (i.e., is a subset of the larger set of data records). In embodiments, the anomaly free data records set is by removing each data record associated with an anomalous value from a plurality of data records. In embodiments, an anomaly free data records set is transmitted to a downstream data consumer.

The term "downstream data consumer" refers to an entity that utilizes processed data records as input (e.g., an application within a computing entity for making decisions based upon a trained model and a stream of input data). In embodiments, the stream of input data provided to the downstream data consumer should be free from anomalies in order to ensure accurate decisions can be made.

IV. EXEMPLARY SYSTEM OPERATION

FIG. 6A illustrates an exemplary process flow (600) for use with embodiments of the present disclosure. In embodiments, an apparatus for detecting anomalous data in an input data set comprises at least one processor and at least one memory including computer program code.

In embodiments, the at least one memory and the computer program code configured to, with the at least one processor, cause the apparatus to receive (601) a plurality of data records from a data source. In embodiments, each data record of the plurality of data records comprises a feature vector comprising a plurality of predictor variables and a plurality of corresponding predictor variable values.

In embodiments, the at least one memory and the computer program code configured to, with the at least one processor, cause the apparatus to, for each data record P of the plurality of data records, apply (602) a first model to the data record P. In embodiments, an output of the first model represents a probability that the data record P belongs to a distribution represented by a true data set. In embodiments, the first model is generated based in part on the true data set and an adversarial data set generated based on the true data set.

In embodiments, the at least one memory and the computer program code configured to, with the at least one processor, cause the apparatus to, upon determining that the first model cannot provide a successful output (e.g., cannot determine a classification) for any data record P of the plurality of data records, output (603) (e.g., transmit for rendering; render for display based on instructions; etc.) an indication that the plurality of data records contains at least on anomalous data record.

FIG. 6B illustrates an exemplary process flow for use with embodiments of the present disclosure. In embodiments, the at least one memory and the computer program code configured to, with the at least one processor, cause the apparatus to identify (620) an anomalous data record upon determining that the first model cannot provide a successful output for any data record P of the plurality of data records.

In such embodiments, the at least one memory and the computer program code configured to, with the at least one processor, cause the apparatus to sequentially apply (611) subsequent models of a plurality of subsequent models to the data record P until a successful output is obtained from one of the subsequent models. In embodiments, the subsequent model from which the successful output is obtained is identified as a final subsequent model.

In such embodiments, the at least one memory and the computer program code configured to, with the at least one processor, cause the apparatus to, determine (612) a predictor variable of the plurality of predictor variables that had been excluded from the final subsequent model from which the successful output was obtained.

In such embodiments, the at least one memory and the computer program code configured to, with the at least one processor, cause the apparatus to identify (613) a corresponding predictor variable value associated with the predictor variable as an anomalous value associated with the data record P.

In such embodiments, the at least one memory and the computer program code configured to, with the at least one processor, cause the apparatus to output (614) instructions for rendering (e.g., for display) an indication that the corresponding predictor variable value associated with the predictor variable is an anomalous value of the data record P.

FIG. 6C illustrates an exemplary process flow for use with embodiments of the present disclosure. In embodiments, the at least one memory and the computer program code are configured to, with the at least one processor, cause the apparatus to generate the first model and the plurality of subsequent models.

In such embodiments, the at least one memory and the computer program code configured to, with the at least one processor, cause the apparatus to receive (621) a true data set comprising a plurality of true data records organized according to a plurality of true data set columns and a plurality of true data set rows. In embodiments, each true data record of the plurality of first data records comprises a feature vector comprising a plurality of predictor variables and a plurality of corresponding predictor variable values. In embodiments, each predictor variable represents a unique true data set column of the plurality of true data set columns. In embodiments, each feature vector represents a unique true data set row of the plurality of true data set rows.

In such embodiments, the at least one memory and the computer program code configured to, with the at least one processor, cause the apparatus to generate (622), based on the true data set, an adversarial data set comprising a plurality of adversarial data records organized according to a plurality of adversarial data set columns and a plurality of adversarial data set rows. In embodiments, wherein each predictor variable represents an adversarial data set column of the plurality of adversarial data set columns. In embodiments, the plurality of adversarial data set rows is generated by, for each predictor variable, randomly shuffling the corresponding predictor variable values.

In such embodiments, the at least one memory and the computer program code configured to, with the at least one processor, cause the apparatus to add (623) a first data set target column to the true data set. In embodiments, each corresponding first data set target row comprises a first classification value.

In such embodiments, the at least one memory and the computer program code configured to, with the at least one processor, cause the apparatus to add (624) a second data set target column to the adversarial data set. In embodiments, each corresponding second data set target row comprises a second classification value.

In such embodiments, the at least one memory and the computer program code configured to, with the at least one processor, cause the apparatus to build (625) the first model to distinguish the true data set from the adversarial data set. In embodiments, a first model output represents a probability of a point P belonging to a sub-space represented by the true data set.

In such embodiments, the at least one memory and the computer program code configured to, with the at least one processor, cause the apparatus to remove (626) a true data set column from the true data set and a corresponding adversarial data set column from the adversarial data set that are both associated with a predictor variable of the first model identified as having a highest feature importance for distinguishing the true data set from the adversarial data set.

In such embodiments, the at least one memory and the computer program code configured to, with the at least one processor, cause the apparatus to, until determining, based on a subsequent model, the true data set can no longer be distinguished from the adversarial data set, iteratively build (627) a plurality of subsequent models to distinguish the true data set from the adversarial data set. In embodiments, each subsequent model is built without a true data set column and adversarial data set column associated with a predictive variable of an immediately preceding subsequent model as having a highest feature importance for distinguishing the true data set from the adversarial data set. In embodiments, the first model and the subsequent models are ranked in an order from most predictive variables to least predictive variables.

In embodiments, each of the first model and subsequent models comprise models whose output comprises a feature importance score. It will be appreciated that any such model is within the scope of the present disclosure.

In embodiments, each of the first model and subsequent models comprise gradient boosted models. In embodiments, a gradient boosted model comprises a plurality of decision trees. In embodiments, each decision tree has a plurality of decision tree feature importance measures associated therewith, and wherein a decision tree feature importance measure represents an amount that each feature split point in the decision tree associated with a particular feature improves a decision tree performance.

In embodiments, the plurality of decision tree feature importance measures are averaged across all of the plurality of decision trees of a model in order to associate a feature importance measure with each feature of the true data set.

In embodiments, the at least one memory and the computer program code are configured to, with the at least one processor, cause the apparatus to generate an anomaly free data records set comprising a subset of the plurality of data records by removing each data record associated with an anomalous value from the plurality of data records, and transmit the anomaly free data records set to a downstream data consumer.

FIGS. 7A-7T illustrate an example of model building and use according to embodiments of the present disclosure.

Referring to FIG. 7A, a true data set 700 is presented. The true data set 700 comprises a plurality of feature vectors (701A-701G) each corresponding to animals (e.g., Mosquito, Salmon, Human, Python, Cat, Blackbird, Blue whale). The feature vectors are made up of a plurality of predictor variable values for associate predictor variables (702A-702H; e.g., type, species, number of eyes, number of legs, number of wings, number of fins, length, and weight).

Figure 7B:
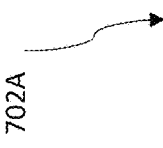
FIGS. 7A-7T illustrate an example of model building and use according to embodiments of the present disclosure.
Figure 7G:
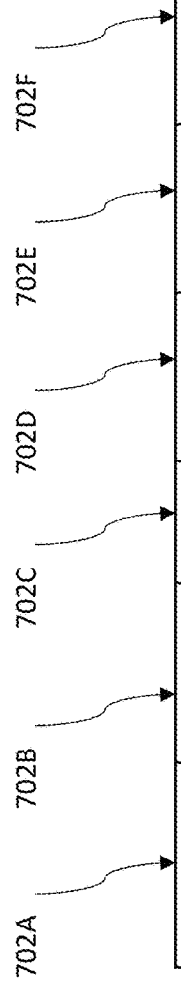
Figure 7H:
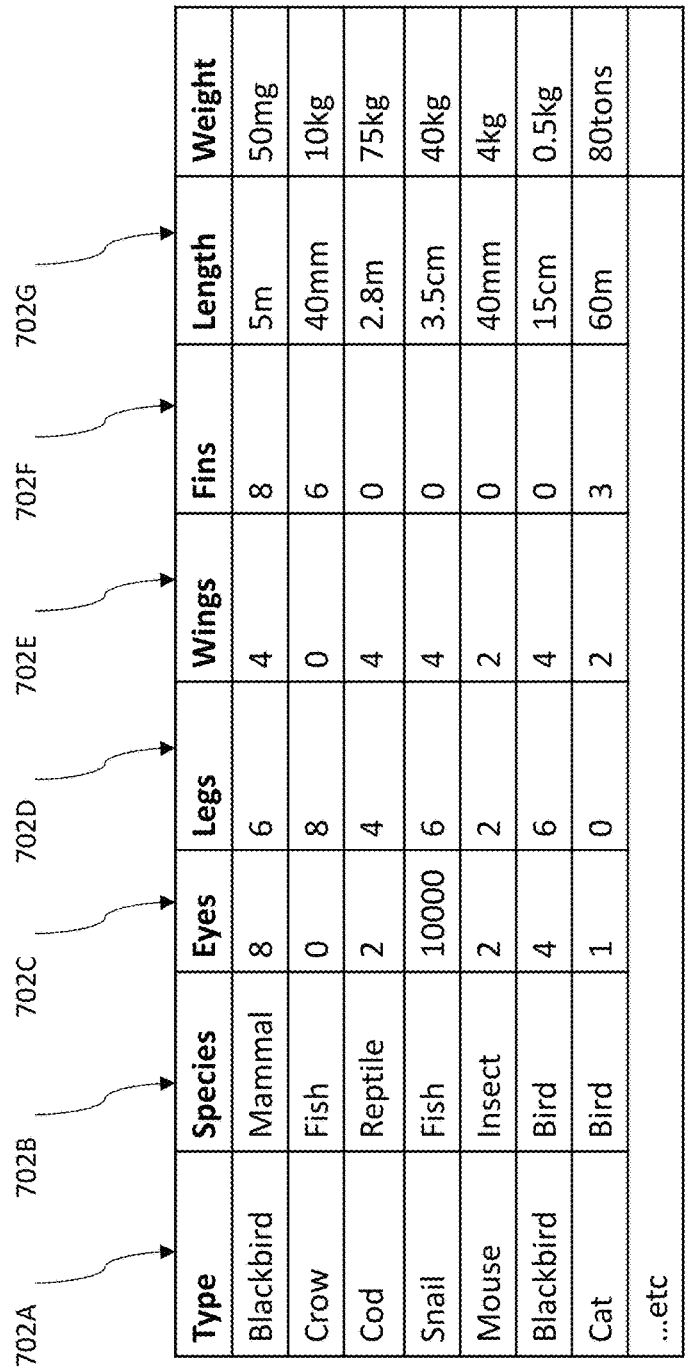
Figure 71:
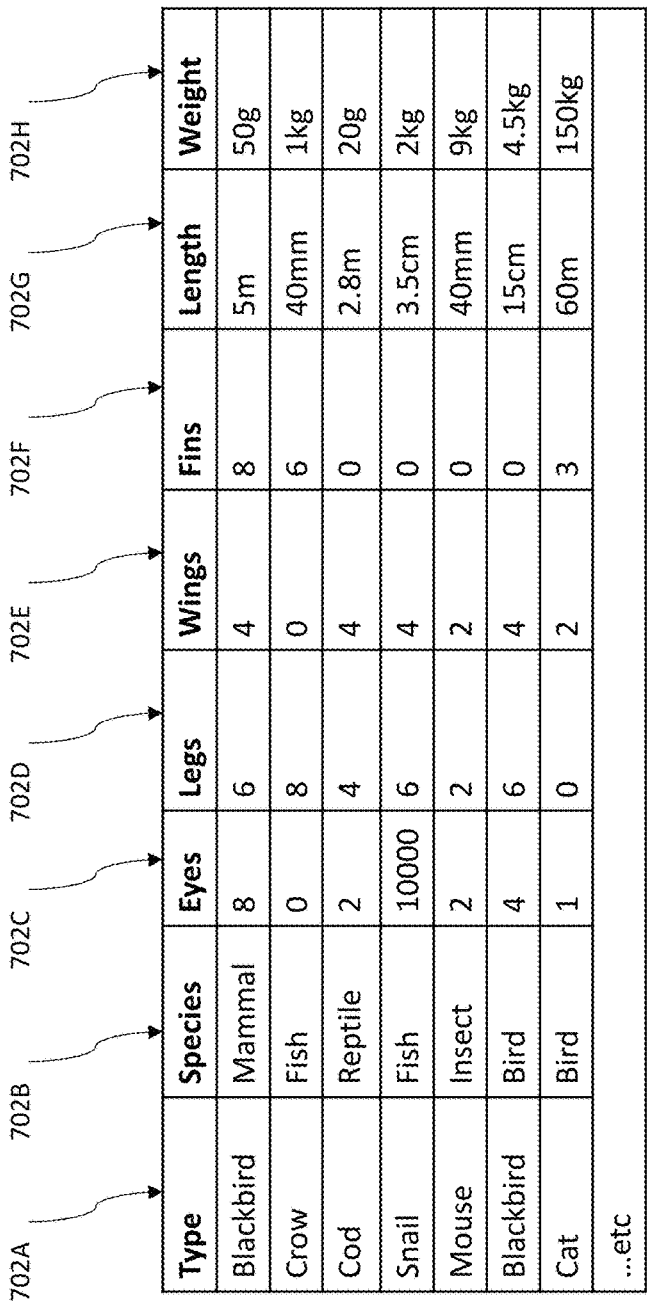

Referring to FIG. 7B, an adversarial data set is generated from the true data set by shuffling each column. In FIG. 7B, the first column (702A) is shuffled. In FIG. 7C, the second column (702B) is shuffled. In FIG. 7D, the third column (702C) is shuffled. In FIG. 7E, the fourth column (702D) is shuffled. In FIG. 7F, the fifth column (702E) is shuffled. In FIG. 7G, the sixth column (702F) is shuffled. In FIG. 7H, the seventh column (702G) is shuffled. In FIG. 7I, the eighth column (702H) is shuffled. The resulting adversarial data set 720 is shown in FIG. 7J. It can be seen that each data point itself is valid, just the rows no longer make sense.

Figure 7K:
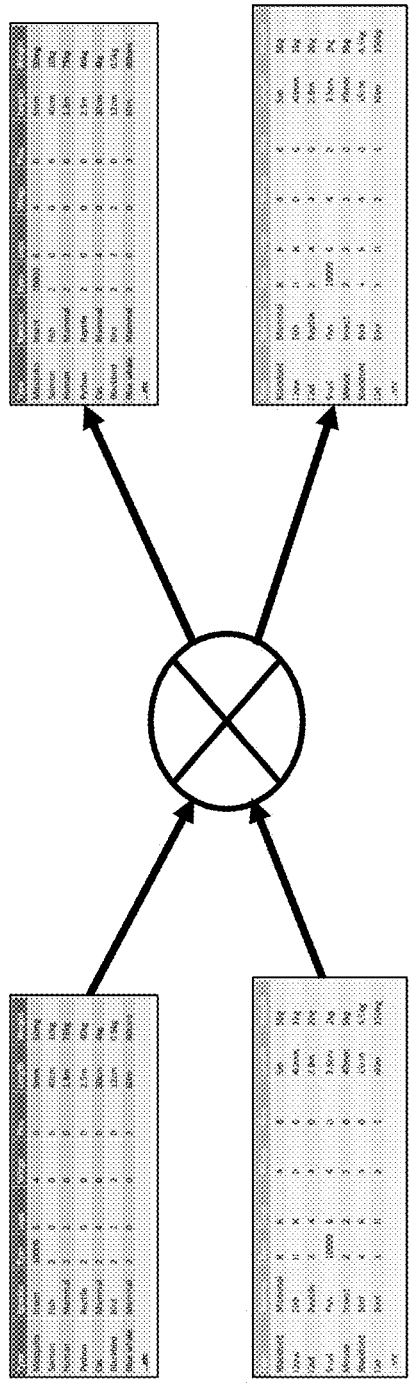

In FIG. 7K, a model is trained to distinguish the true data set from the adversarial data set.

In FIG. 7L, the model highlights a column as being the most important in helping distinguish the true data set from the adversarial data set.

In FIG. 7M, the most important column (e.g., fins) is removed from the true data set and the adversarial data set, and a new model is built.

In FIG. 7N, the most important column from the model built based on the updated data sets is identified (e.g., legs) and removed from the data sets. Another model is built.

In FIG. 7O, the most important column from the model built based on the updated data sets is identified (e.g., wings) and removed from the data sets. Another model is built.

In FIG. 7P, the most important column from the model built based on the updated data sets is identified (e.g., eyes) and removed from the data sets. Another model is built.

In FIG. 7Q, the most important column from the model build based on the updated data sets is identified (e.g., type) and removed from the data sets. Another model is built.

In FIG. 7R, the most important column from the model builT based on the updated data sets is identified (e.g., species) and removed from the data sets. Another model is built.

Shown in FIG. 7S, the model is no longer able to distinguish between the true data set and the adversarial data set.

As a result of the iterative building of these models and corresponding identification of most important features, a ranked plurality of models (shown in FIG. 7T), is available with the most important features ranked by their level of importance in distinguishing the true data set from the adversarial data set.

Figure 8A:
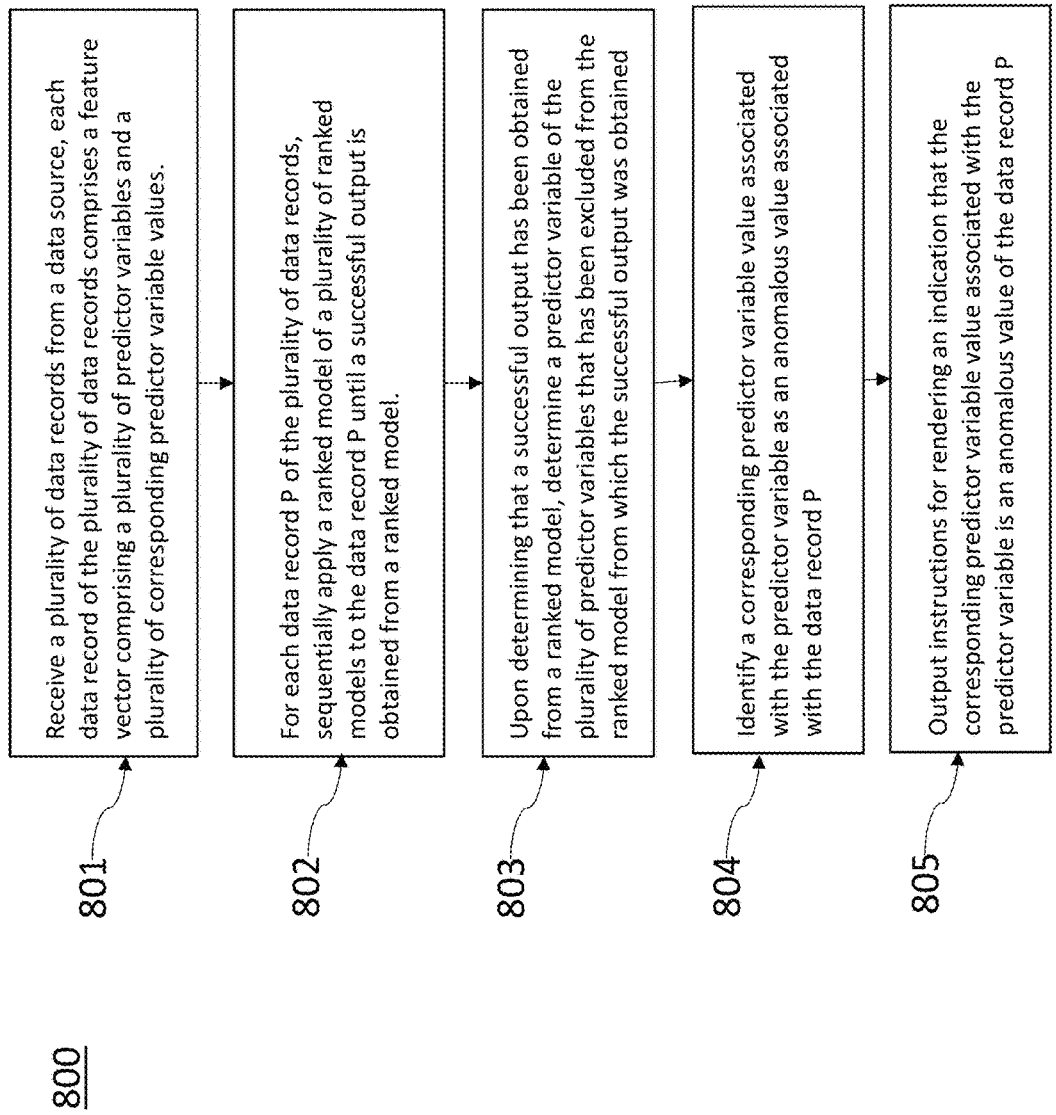
FIG. 8A illustrates an exemplary process flow for use with embodiments of the present disclosure.
Figure 8B:
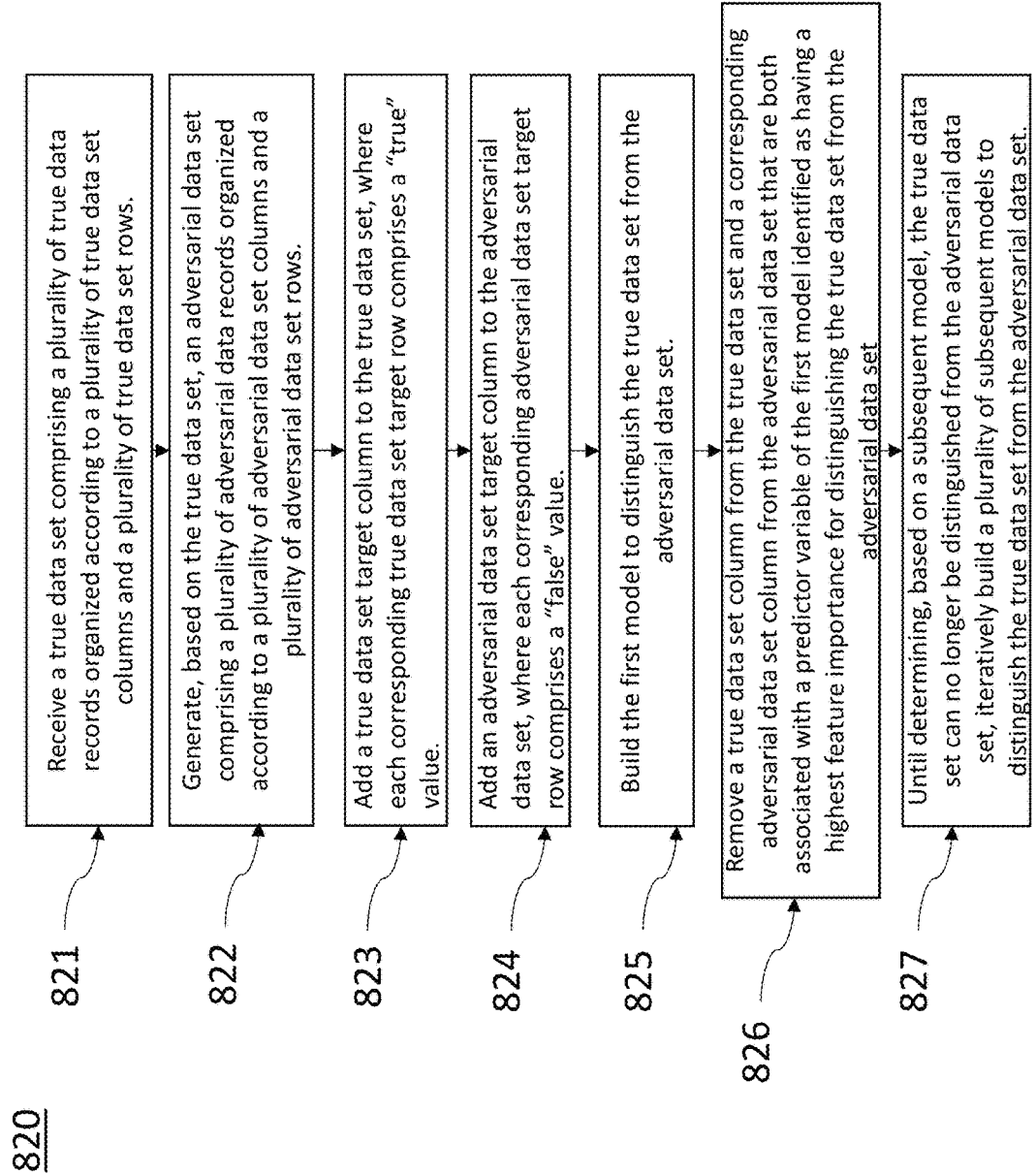
FIG. 8B illustrates an exemplary process flow for use with embodiments of the present disclosure.

FIGS. 8A-8B illustrate an exemplary process for determining an axis parallel explanation, according to embodiments of the present disclosure.

FIG. 8A illustrates an exemplary process flow (800) for use with embodiments of the present disclosure. In embodiments, an apparatus for identifying anomalous data in an input data set comprises at least one processor and at least one memory including computer program code.

In embodiments, the at least one memory and the computer program code configured to, with the at least one processor, cause the apparatus to receive (801) a plurality of data records from a data source. In embodiments, each data record of the plurality of data records comprises a feature vector comprising a plurality of predictor variables and a plurality of corresponding predictor variable values.

In embodiments, the at least one memory and the computer program code configured to, with the at least one processor, cause the apparatus to, for each data record P of the plurality of data records, sequentially apply (802) each ranked model of a plurality of ranked models to the data record P until a successful output is obtained from a ranked model. In embodiments, the ranked models are applied in a sequential order according to their rankings relative to the other ranked models.

In embodiments, the at least one memory and the computer program code configured to, with the at least one processor, cause the apparatus to, upon determining a successful output (e.g., a classification has been determined) has been obtained from a ranked model, determine (803) determine a predictor variable of the plurality of predictor variables that has been excluded from the ranked model from which the successful output was obtained.

In such embodiments, the at least one memory and the computer program code configured to, with the at least one processor, cause the apparatus to identify (804) a corresponding predictor variable value associated with the predictor variable as an anomalous value associated with the data record P.

In such embodiments, the at least one memory and the computer program code configured to, with the at least one processor, cause the apparatus to output (805) instructions for rendering (e.g., for display) an indication that the corresponding predictor variable value associated with the predictor variable is an anomalous value of the data record P.

FIG. 6B illustrates an exemplary process flow (820) for use with embodiments of the present disclosure. In embodiments, the at least one memory and the computer program code are configured to, with the at least one processor, cause the apparatus to generate the first model and the plurality of subsequent models.

In such embodiments, the at least one memory and the computer program code configured to, with the at least one processor, cause the apparatus to receive (821) a true data set comprising a plurality of true data records organized according to a plurality of true data set columns and a plurality of true data set rows. In embodiments, each true data record of the plurality of first data records comprises a feature vector comprising a plurality of predictor variables and a plurality of corresponding predictor variable values. In embodiments, each predictor variable represents a unique true data set column of the plurality of true data set columns. In embodiments, each feature vector represents a unique true data set row of the plurality of true data set rows.

In such embodiments, the at least one memory and the computer program code configured to, with the at least one processor, cause the apparatus to generate (822), based on the true data set, an adversarial data set comprising a plurality of adversarial data records organized according to a plurality of adversarial data set columns and a plurality of adversarial data set rows. In embodiments, wherein each predictor variable represents an adversarial data set column of the plurality of adversarial data set columns. In embodiments, the plurality of adversarial data set rows is generated by, for each predictor variable, randomly shuffling the corresponding predictor variable values.

In such embodiments, the at least one memory and the computer program code configured to, with the at least one processor, cause the apparatus to add (823) a first data set target column to the true data set. In embodiments, each corresponding first data set target row comprises a first classification value.

In such embodiments, the at least one memory and the computer program code configured to, with the at least one processor, cause the apparatus to add (824) a second data set target column to the adversarial data set. In embodiments, each corresponding second data set target row comprises a second classification value.

In such embodiments, the at least one memory and the computer program code configured to, with the at least one processor, cause the apparatus to build (825) the first model to distinguish the true data set from the adversarial data set. In embodiments, a first model output represents a probability of a point P belonging to a sub-space represented by the true data set.

In such embodiments, the at least one memory and the computer program code configured to, with the at least one processor, cause the apparatus to remove (826) a true data set column from the true data set and a corresponding adversarial data set column from the adversarial data set that are both associated with a predictor variable of the first model identified as having a highest feature importance for distinguishing the true data set from the adversarial data set.

In such embodiments, the at least one memory and the computer program code configured to, with the at least one processor, cause the apparatus to, until determining, based on a subsequent model, the true data set can no longer be distinguished from the adversarial data set, iteratively build (827) a plurality of subsequent models to distinguish the true data set from the adversarial data set. In embodiments, each subsequent model is built without a true data set column and adversarial data set column associated with a predictive variable of an immediately preceding subsequent model as having a highest feature importance for distinguishing the true data set from the adversarial data set. In embodiments, the first model and the subsequent models are ranked in an order from most predictive variables to least predictive variables.

In embodiments, each of the first model and subsequent models comprise models whose output comprises a feature importance score. It will be appreciated that any such model is within the scope of the present disclosure.

In embodiments, each of the first model and subsequent models comprise gradient boosted models. In embodiments, a gradient boosted model comprises a plurality of decision trees. In embodiments, each decision tree has a plurality of decision tree feature importance measures associated therewith, and wherein a decision tree feature importance measure represents an amount that each feature split point in the decision tree associated with a particular feature improves a decision tree performance.

In embodiments, the plurality of decision tree feature importance measures is averaged across all of the plurality of decision trees of a model in order to associate a feature importance measure with each feature of the true data set.

In embodiments, the at least one memory and the computer program code are configured to, with the at least one processor, cause the apparatus to generate an anomaly free data records set comprising a subset of the plurality of data records by removing each data record associated with an anomalous value from the plurality of data records, and transmit the anomaly free data records set to a downstream data consumer.

Figure 9B:
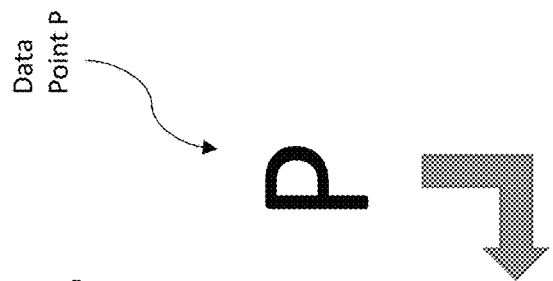
Figure 9C:
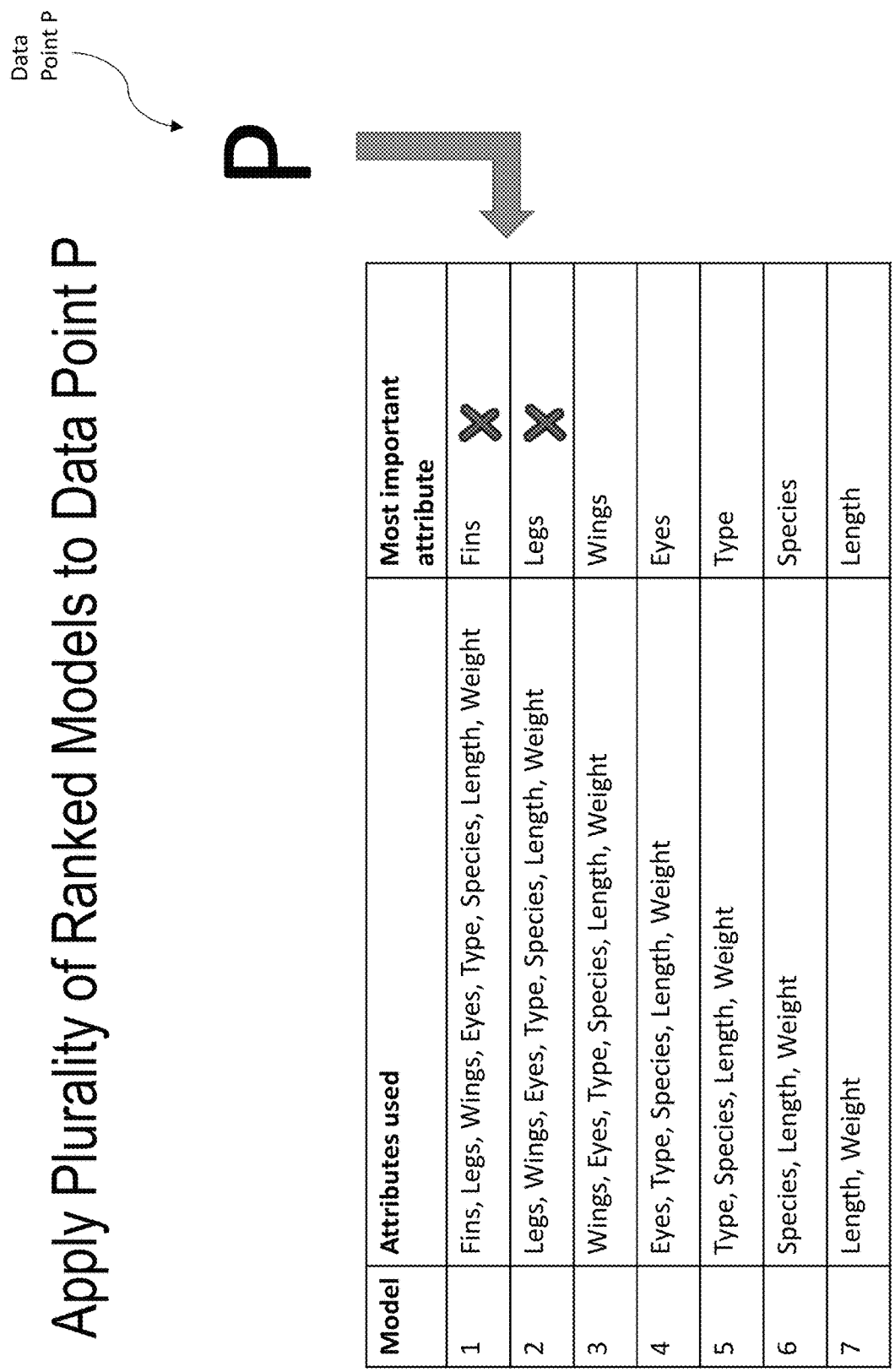

FIGS. 9A-9C illustrate an application of a plurality of ranked models to a data point P, according to embodiments of the present disclosure. In embodiments, a first model is applied to data point P and the first model is unable to classify the data point P. Subsequently, a second model is applied to data point P and the second model is unable to classify the data point P.

Figure 9D:

Subsequently, shown in FIG. 9D, a third model is applied to data point P and the third model is unable to classify the data point P.

Figure 9E:
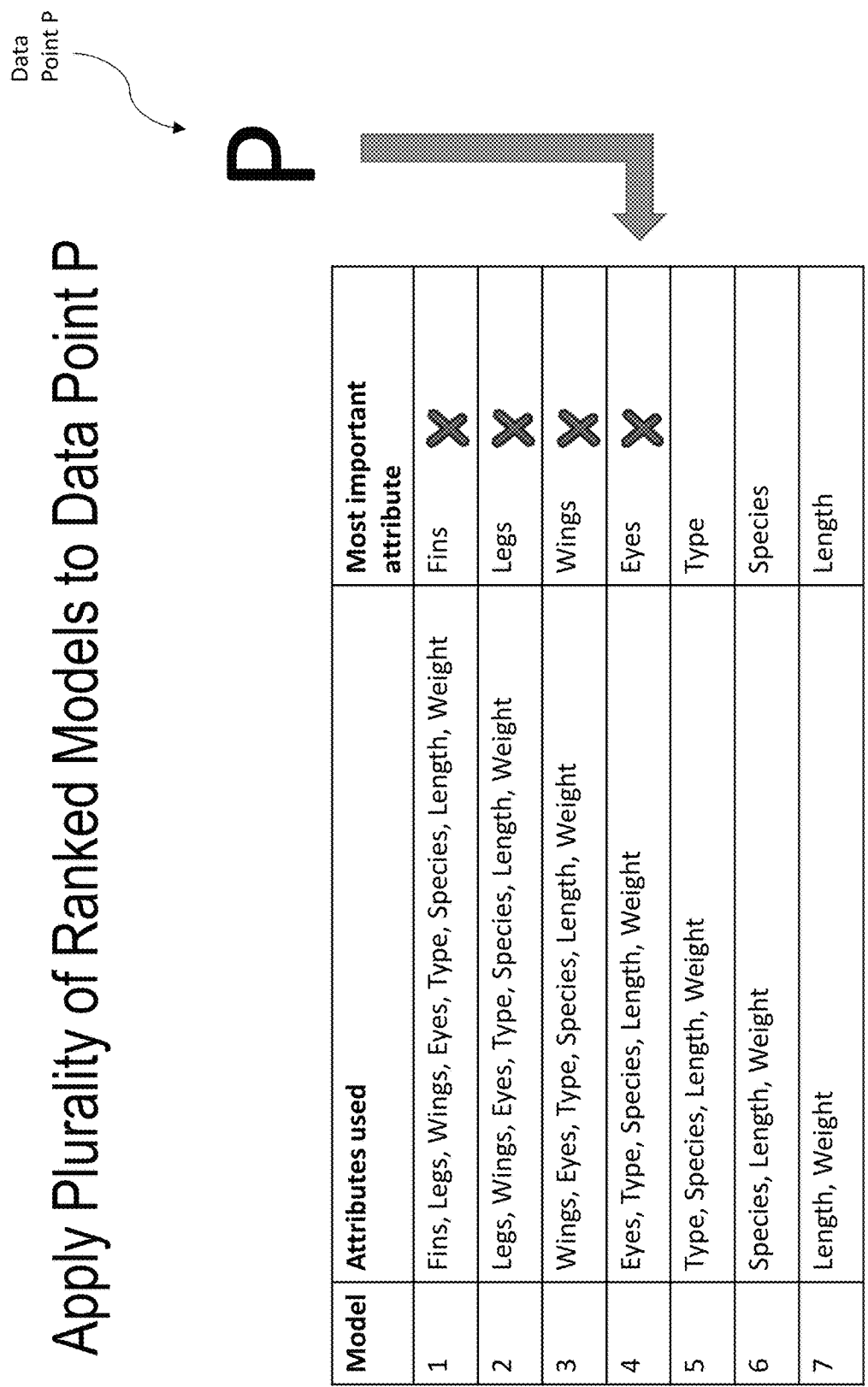

Subsequently, shown in FIG. 9E, a fourth model is applied to data point P and the fourth model is unable to classify the data point P.

Figure 9F:
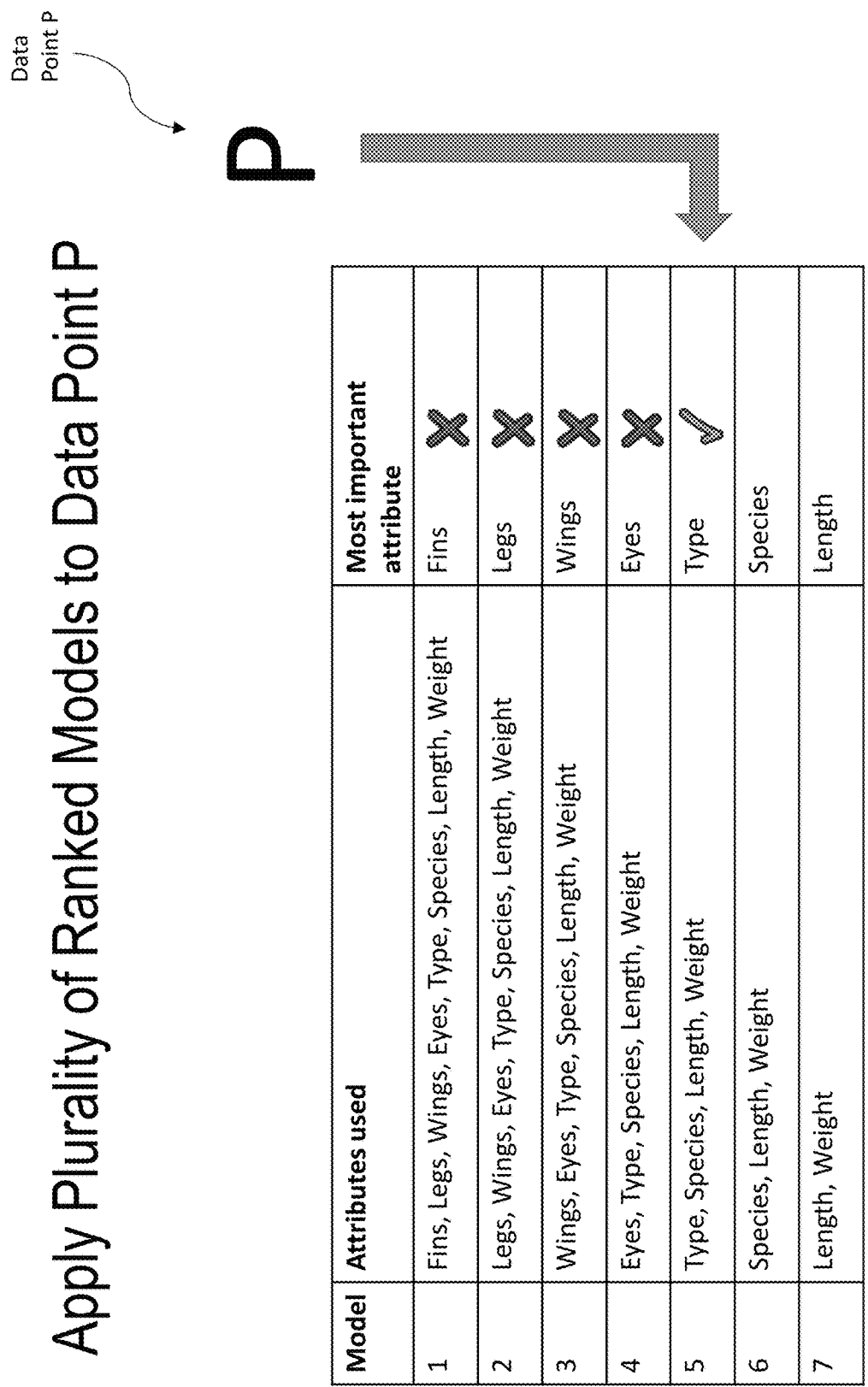

Subsequently, shown in FIG. 9F, a fifth model is applied to data point P and the third model is able to classify the data point P. Accordingly, it can be concluded that the data point P is an anomalous data point, and it is the feature "Eyes" which makes the data point anomalous. It can be concluded as such because the fifth model had dropped the feature or attribute which made the data point anomalous.

In other embodiments, multiple anomalies can be detected within a single data point (e.g., data record/feature vector). In such embodiments, an anomalous column can be replaced with a suitable imputation of the data point in this column so that the data point may no longer be anomalous. Subsequently, other anomalous dimensions/features/attributes may be identified.

Sample pseudo-code for determining anomalous dimensions of an unseen point P (if any) is detailed and further described in Table 2. The variable thr can be set to any appropriate threshold, e.g. thr=0.5.

TABLE 2

Sample Pseudo-code for Determining Anomalous Dimensions

| Pseudo Code | Explanation |
| --- | --- |
| anom_dim = { } | Start with an empty set of anomalous dimensions. |
| while M_0(P)<thr: | Iterate until P fits M_0. |
| i = 1 | Starting at i = 1, iterate until P fits M_i. |
| while M_i(P)<thr: | |
| i++ | |
| anom_dims += {i-1} | It follows if P fits M_i and did not fit M_{i-1} that dimension {i-1} must be anomalous. |
| P{i-1} = impute(A{i-1}) | Eliminate this anomalous dimension by setting the {i-1} dimension to P to a suitably imputed point of the true set along this same dimension. |

It will be appreciated that embodiments have been presented herein that enable changepoint detection (e.g., ensuring that new data presented to a trained model is drawn from the same distribution as the data on which the model was trained), pointwise validation (e.g., determining if an individual point belongs to the same distribution as the model training set and using this determination to decide whether to trust the model output for that point, and pinpointing of attribute(s) on which a new data point fails the conform to the training set.

V. CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A system comprising one or more processors, and at least one memory comprising computer program code, the at least one memory and the computer program code configured to, with the one or more processors, cause the system to:
    receive a plurality of data records from a data source, each data record of the plurality of data records comprising a feature vector comprising (i) a plurality of predictor variables and (ii) a plurality of corresponding predictor variable values;
    for each data record of the plurality of data records,
        apply a first machine learning model that is trained with a true data set and an adversarial data set to the data record to generate an output that represents a probability that the data record belongs to a distribution represented by the true data set; and
        responsive to determining that the output is not a first successful output, sequentially apply one or more subsequent machine learning models of a plurality of subsequent machine learning models to the data record until a second successful output is obtained, wherein (i) the one or more subsequent machine learning models are iteratively generated based on an updated true data set and an updated adversarial data set, (ii) the updated true data set is without a true data set column, (iii) the updated adversarial data set is without an adversarial data set column, and (iv) the true data set column and the adversarial data set column are associated with a predictive variable of an immediately preceding subsequent machine learning model having a highest feature importance for distinguishing the true data set from the adversarial data set; and
    output an indication that the plurality of data records contains at least one anomalous data record based at least in part on the second successful output.

2. The system of claim 1, wherein the at least one memory and the computer program code are configured to, with the one or more processors, cause the system to:
    determine a predictor variable of the plurality of predictor variables that had been excluded from a final subsequent machine learning model from which the second successful output was obtained; and
    identify a corresponding predictor variable value associated with the predictor variable as an anomalous value associated with the data record.

3. The system of claim 2, wherein generating the first machine learning model and the plurality of subsequent machine learning models comprises:
    receiving the true data set comprising a plurality of true data records organized according to a plurality of true data set columns and a plurality of true data set rows, each true data record of the plurality of true data records comprising a feature vector comprising (i) a plurality of predictor variables and (ii) a plurality of corresponding predictor variable values, wherein (a) each predictor variable represents a unique true data set column of the plurality of true data set columns and (b) each feature vector represents a unique true data set row of the plurality of true data set rows;
    generating, based at least in part on the true data set, the adversarial data set comprising a plurality of adversarial data records organized according to a plurality of adversarial data set columns and a plurality of adversarial data set rows, wherein each predictor variable represents an adversarial data set column of the plurality of adversarial data set columns, and wherein the plurality of adversarial data set rows is generated by, for each predictor variable, randomly shuffling corresponding predictor variable values;
    adding a first data set target column to the true data set, wherein each corresponding first data set target row comprises a first classification value;
    adding a second data set target column to the adversarial data set, wherein each corresponding second data set target row comprises a second classification value;
    generating the first machine learning model configured to distinguish the true data set from the adversarial data set, wherein a first machine learning model output represents a probability of a point belonging to a sub-space represented by the true data set;
    removing a true data set column from the true data set and a corresponding adversarial data set column from the adversarial data set that are both associated with a predictor variable of the first machine learning model identified as having a highest feature importance for distinguishing the true data set from the adversarial data set; and
    until determining, based at least in part on a subsequent machine learning model, that the true data set can no longer be distinguished from the adversarial data set, iteratively generating a plurality of subsequent machine learning models each configured to distinguish the true data set from the adversarial data set, wherein the first machine learning model and the plurality of subsequent machine learning models are ranked in an order from most predictive variables to least predictive variables.

4. The system of claim 3, wherein each of the first machine learning model and plurality of subsequent machine learning models comprises a machine learning model whose output comprises a feature importance score.

5. The system of claim 4, wherein each of the first machine learning model and plurality of subsequent machine learning models comprises a gradient boosted machine learning model comprising a plurality of decision trees.

6. The system of claim 5, wherein each decision tree has a plurality of decision tree feature importance measures associated therewith, and wherein a decision tree feature importance measure represents an amount that each feature split point in the decision tree associated with a particular feature improves a decision tree performance.

7. The system of claim 2, wherein the at least one memory and the computer program code are configured to, with the one or more processors, cause the system to:
    generate an anomaly free data records set comprising a subset of the plurality of data records by removing each data record associated with an anomalous value from the plurality of data records; and
    transmit the anomaly free data records set to a downstream data consumer.

8. The system of claim 2, wherein the at least one memory and the computer program code are configured to, with the one or more processors, cause the system to:
transmit instructions for rendering an indication that a corresponding predictor variable value associated with the predictor variable is an anomalous value associated with the data record.

9. The system of claim 1, wherein the one or more subsequent machine learning models are sequentially applied to the data record in an order from most predictive variables to least predictive variables.

10. The system of claim 1, wherein the plurality of data records comprises insurance claims data.

11. One or more non-transitory computer readable storage media including instructions that, when executed by one or more processors, cause the one or more processors to:
receive a plurality of data records from a data source, each data record of the plurality of data records comprising a feature vector comprising (i) a plurality of predictor variables and (ii) a plurality of corresponding predictor variable values;
for each data record of the plurality of data records,
apply a first machine learning model that is trained with a true data set and an adversarial data set to the data record to generate an output that represents a probability that the data record belongs to a distribution represented by the true data set; and
responsive to determining that the output is not a first successful output, sequentially apply one or more subsequent machine learning models of a plurality of subsequent machine learning models to the data record until a second successful output is obtained, wherein (i) the one or more subsequent machine learning models are iteratively generated based on an updated true data set and an updated adversarial data set, (ii) the updated true data set is without a true data set column, (iii) the updated adversarial data set is without an adversarial data set column, and (iv) the true data set column and the adversarial data set column are associated with a predictive variable of an immediately preceding subsequent machine learning model having a highest feature importance for distinguishing the true data set from the adversarial data set; and
output an indication that the plurality of data records contains at least one anomalous data record based at least in part on the second successful output.

12. The one or more non-transitory computer readable storage media of claim 11, wherein the instructions, when executed by the one or more processors, further cause the one or more processors to:
determine a predictor variable of the plurality of predictor variables that had been excluded from a final subsequent machine learning model from which the second successful output was obtained; and
identify a corresponding predictor variable value associated with the predictor variable as an anomalous value associated with the data record.

13. The one or more non-transitory computer readable storage medium of claim 12, wherein generating the first machine learning model and the plurality of subsequent machine learning models comprises:
receiving the true data set comprising a plurality of true data records organized according to a plurality of true data set columns and a plurality of true data set rows, each true data record of the plurality of true data records comprising a feature vector comprising (i) a plurality of predictor variables and (ii) a plurality of corresponding predictor variable values, wherein (a) each predictor variable represents a unique true data set column of the plurality of true data set columns and (b) each feature vector represents a unique true data set row of the plurality of true data set rows;
generating, based at least in part on the true data set, the adversarial data set comprising a plurality of adversarial data records organized according to a plurality of adversarial data set columns and a plurality of adversarial data set rows, wherein each predictor variable represents an adversarial data set column of the plurality of adversarial data set columns, and wherein the plurality of adversarial data set rows is generated by, for each predictor variable, randomly shuffling corresponding predictor variable values;
adding a first data set target column to the true data set, wherein each corresponding first data set target row comprises a first classification value;
adding a second data set target column to the adversarial data set, wherein each corresponding second data set target row comprises a second classification value;
generating the first machine learning model configured to distinguish the true data set from the adversarial data set, wherein a first machine learning model output represents a probability of a point belonging to a sub-space represented by the true data set;
removing a true data set column from the true data set and a corresponding adversarial data set column from the adversarial data set that are both associated with a predictor variable of the first machine learning model identified as having a highest feature importance for distinguishing the true data set from the adversarial data set; and
until determining, based at least in part on a subsequent machine learning model, that the true data set can no longer be distinguished from the adversarial data set, iteratively generating a plurality of subsequent machine learning models each configured to distinguish the true data set from the adversarial data set, and wherein the first machine learning model and the plurality of subsequent machine learning models are ranked in an order from most predictive variables to least predictive variables.

14. The one or more non-transitory computer readable storage media of claim 13, wherein each of the first machine learning model and plurality of subsequent machine learning models comprises a machine learning model whose output comprises a feature importance score.

15. The one or more non-transitory computer readable storage media of claim 14, wherein each of the first machine learning model and plurality of subsequent machine learning models comprises a gradient boosted machine learning model comprising a plurality of decision trees.

16. The one or more non-transitory computer readable storage media of claim 15, wherein each decision tree has a plurality of decision tree feature importance measures associated therewith, and wherein a decision tree feature importance measure represents an amount that each feature split point in the decision tree associated with a particular feature improves a decision tree performance.

17. The one or more non-transitory computer readable storage media of claim 12, wherein the instructions, when executed by the one or more processors, further cause the one or more processors to:
generate an anomaly free data records set comprising a subset of the plurality of data records by removing each data record associated with an anomalous value from the plurality or data records; and transmit the anomaly free data records set to a downstream data consumer.

18. The one or more non-transitory computer readable storage media of claim 12, wherein the instructions, when executed by the one or more processors, further cause the one processors to:

transmit instructions for rendering an indication that a corresponding predictor variable value associated the predictor variable is an anomalous value associated with the data record.

19. The one or more non-transitory computer readable storage media of claim 11, wherein the one or more subsequent machine learning models are sequentially applied to the data record in an order from most predictive variables to least predictive variables.

20. The one or more non-transitory computer readable storage media of claim 11, wherein the plurality of data records comprises insurance claims data.

21. A computer-implemented method, comprising:

receiving, by one or more processors, a plurality of data records from a data source, each data record of the plurality of data records comprising (i) a feature vector comprising a plurality of predictor variables and (ii) a plurality of corresponding predictor variable values;

for each data record of the plurality of data records, applying, by the one or more processors, a first machine learning model that is trained with a true data set and an adversarial data set to the data record to generate an output that represents a probability that the data record belongs to a distribution represented by the true data set; and responsive to determining, by the one or more processors, that the output is not a first successful output, sequentially applying, by the one or more processors, one or more subsequent machine learning models of a plurality of subsequent machine learning models to the data record until a second successful output is obtained, wherein (i) the one or more subsequent machine learning models are iteratively generated based on an updated true data set and an updated adversarial data set, (ii) the updated true data set is without a true data set column, (iii) the updated adversarial data set is without an adversarial data set column, and (iv) the true data set column and the adversarial data set column are associated with a predictive variable of an immediately preceding subsequent machine learning model having a highest feature importance for distinguishing the true data set from the adversarial data set; and outputting, by the one or more processors, an indication that the plurality of data records contains at least one anomalous data record based at least in part on the second successful output.

22. The computer-implemented method of claim 21, further comprising:

determining a predictor variable of the plurality of predictor variables that had been excluded from a final subsequent machine learning model from which the second successful output was obtained; and identifying a corresponding predictor variable value associated with the predictor variable as an anomalous value associated with the data record.

23. The computer-implemented method of claim 22, further comprising generating the first machine learning model and the plurality of subsequent machine learning models by:

receiving the true data set comprising a plurality of true data records organized according to a plurality of true data set columns and a plurality of true data set rows, each true data record of the plurality of true data records comprising a feature vector comprising (i) a plurality of predictor variables and (ii) a plurality of corresponding predictor variable values, wherein (a) each predictor variable represents a unique true data set column of the plurality of true data set columns and (b) each feature vector represents a unique true data set row of the plurality of true data set rows;

generating, based at least in part on the true data set, the adversarial data set comprising a plurality of adversarial data records organized according to a plurality of adversarial data set columns and a plurality of adversarial data set rows, wherein each predictor variable represents an adversarial data set column of the plurality of adversarial data set columns, and wherein the plurality of adversarial data set rows is generated by, for each predictor variable, randomly shuffling the corresponding predictor variable values;

adding a first data set target column to the true data set, wherein each corresponding first data set target row comprises a first classification value;

adding a second data set target column to the adversarial data set, wherein each corresponding second data set target row comprises a second classification value;

generating the first machine learning model configured to distinguish the true data set from the adversarial data set, wherein a first machine learning model output represents a probability or a point belonging to a sub-space represented by the true data set;

removing a true data set column from the true data set and a corresponding adversarial data set column from the adversarial data set that are both associated with a predictor variable of the first machine learning model identified as having a highest feature importance for distinguishing the true data set from the adversarial data set; and until determining, based at least in part on a subsequent machine learning model, that the true data set can no longer be distinguished from the adversarial data set, iteratively generating a plurality of subsequent machine learning models each configured to distinguish the true data set from the adversarial data set, wherein the first machine learning model and the plurality of subsequent machine learning models are ranked in an order from most predictive variables to least predictive variables.

24. The computer-implemented method of claim 23, wherein each of the first machine learning model and subsequent machine learning models comprises a machine learning model whose output comprises a feature importance score.

25. The computer-implemented method of claim 24, wherein each of the first machine learning model and subsequent machine learning models comprises a gradient boosted machine learning model comprising a plurality of decision trees.

26. The computer-implemented method of claim 25, wherein each decision tree has a plurality of decision tree feature importance measures associated therewith, and wherein a decision tree feature importance measure represents an amount that each feature split point in the decision tree associated with a particular feature improves a decision tree performance.

27. The computer-implemented method of claim 22, further comprising:
- generating an anomaly free data records set comprising a subset of the plurality of data records by removing each data record associated with an anomalous value from the plurality of data records; and
- transmitting the anomaly free data records set to a downstream data consumer.

28. The computer-implemented method of claim 22, further comprising:
- transmitting instructions for rendering an indication that a corresponding predictor variable value associated with the predictor variable is an anomalous value associated with the data record.

29. The computer-implemented method of claim 21, wherein the one or more subsequent machine learning models are sequentially applied to the data record in an order from most predictive variables to least predictive variables.

30. The computer-implemented method of claim 21, wherein the plurality of data records comprises insurance claims data.

* * * * *

UNITED STATES PATENT AND TRADEMARK OFFICE
CERTIFICATE OF CORRECTION

| | |
|---|---|
| PATENT NO. | : 11,941,502 B2 |
| APPLICATION NO. | : 16/560842 |
| DATED | : March 26, 2024 |
| INVENTOR(S) | : Lorcan B. Mac Manus et al. |

It is certified that error appears in the above-identified patent and that said Letters Patent is hereby corrected as shown below:

On the Title Page

In Column 1, item (12), Line 1, delete "MacManus" and insert -- Mac Manus --, therefor.

In Column 1, item (54), Title, and in the Specification, Column 1, Line 2, after "PARALLEL", insert -- EXPLANATIONS --, therefor.

In Column 1, item (72), Inventors, Line 1, delete "MacManus," and insert -- Mac Manus, --, therefor.

In the Claims

In Column 29, Line 60, Claim 13, delete "medium" and insert -- media --, therefor.

In Column 30, Line 40, Claim 13, delete "set, and" and insert -- set, --, therefor.

In Column 31, Line 8, Claim 18, delete "one" and insert -- one or more --, therefor.

Signed and Sealed this
Thirtieth Day of July, 2024

Katherine Kelly Vidal
*Director of the United States Patent and Trademark Office*